(12) United States Patent
Fujimura et al.

(10) Patent No.: US 8,137,800 B2
(45) Date of Patent: Mar. 20, 2012

(54) POROUS MULTILAYERED HOLLOW-FIBER MEMBRANE AND PROCESS FOR PRODUCING THE SAME

(75) Inventors: Hirokazu Fujimura, Tokyo (JP); Noboru Kubota, Tokyo (JP); Masatoshi Hashino, Tokyo (JP); Tetsuo Shimizu, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 725 days.

(21) Appl. No.: 12/089,729

(22) PCT Filed: Oct. 11, 2006

(86) PCT No.: PCT/JP2006/320251
§ 371 (c)(1),
(2), (4) Date: Jan. 5, 2009

(87) PCT Pub. No.: WO2007/043553
PCT Pub. Date: Apr. 19, 2007

(65) Prior Publication Data
US 2009/0297822 A1    Dec. 3, 2009

(30) Foreign Application Priority Data

Oct. 13, 2005 (JP) ................................. 2005-298374
May 2, 2006 (JP) ................................. 2006-128119

(51) Int. Cl.
*B32B 3/10* (2006.01)
*B29C 44/22* (2006.01)
*B32B 5/22* (2006.01)

(52) U.S. Cl. ...................... 428/314.2; 428/364; 428/373; 264/45.3

(58) Field of Classification Search .............. 428/314.2, 428/364, 373; 264/45.3
See application file for complete search history.

(56) References Cited

U.S. PATENT DOCUMENTS 4,266,026 A * 5/1981 Breslau ........................... 435/99
(Continued)

FOREIGN PATENT DOCUMENTS
CN 1458859 11/2003
(Continued)

OTHER PUBLICATIONS

Office Action issued Sep. 25, 2008 in corresponding Taiwanese application.

(Continued)

*Primary Examiner* — Norca L Torres Velazquez
(74) *Attorney, Agent, or Firm* — Finnegan, Henderson, Farabow, Garrett & Dunner, L.L.P.

(57) ABSTRACT

A porous hollow fiber membrane which has high blocking performance and high water permeability suitable for filtration and the like and exhibits excellent strength, and a process for stably producing the porous hollow fiber membrane are disclosed. The process utilizes a hollow fiber molding nozzle having two or more circular discharge ports which are disposed concentrically. Multilayer melt-extrusion is performed by discharging molten mixtures which include a thermoplastic resin and an organic liquid and differ in composition from the adjacent discharge ports. The resulting product is cooled to solidify to obtain a hollow fiber. The organic liquid is then removed from the hollow fiber by extraction to produce a porous hollow fiber membrane. The molten mixture discharged from at least one circular discharge port includes an inorganic fine powder in addition to the thermoplastic resin and the organic liquid. The inorganic fine powder is removed by extraction after cooling in addition to the organic liquid.

29 Claims, 33 Drawing Sheets

U.S. PATENT DOCUMENTS

| | | | |
|---|---|---|---|
| 4,623,670 | A | 11/1986 | Mutoh et al. |
| 4,713,292 | A * | 12/1987 | Takemura et al. ............ 428/373 |
| 5,022,990 | A | 6/1991 | Doi et al. |
| 6,299,773 | B1 | 10/2001 | Takamura et al. |
| 6,632,366 | B1 * | 10/2003 | Nakatsuka et al. ........... 210/655 |
| 7,128,861 | B2 | 10/2006 | Hamanaka et al. |
| 7,258,914 | B2 | 8/2007 | Morikawa et al. |
| 2003/0107150 | A1 | 6/2003 | Hamanaka et al. |
| 2003/0232184 | A1 | 12/2003 | Morikawa et al. |

FOREIGN PATENT DOCUMENTS

| | | |
|---|---|---|
| CN | 1556833 | 12/2004 |
| EP | 1 010 457 A1 | 6/2000 |
| JP | 49-62380 | 6/1974 |
| JP | 60-139815 | 7/1985 |
| JP | 61-233026 | 10/1986 |
| JP | 3-215535 | 9/1991 |
| JP | 4-45830 | 2/1992 |
| JP | 4-65505 | 3/1992 |
| JP | 10-168218 | 6/1998 |
| JP | 2002-56979 | 2/2002 |
| JP | 2002-233739 | 8/2002 |
| KR | 2003-0001474 | 1/2003 |
| TW | 311947 | 8/1997 |
| WO | WO 02/070115 A1 | 9/2002 |
| WO | WO 02/070115 A1 | 9/2002 |
| WO | WO 2005/063366 A2 | 7/2005 |

OTHER PUBLICATIONS

Office Action issued Dec. 10, 2009 in corresponding Korean application.

H. Matsuyama, "Production of Polymer Porous Membrane by Thermally Induced Phase Separation (TIPS) Method," Chemical Engineering, pp. 45-56 (Jun. 1998).

A. Takizawa, "Membrane," pp. 404-406 (Jan. 1992).

D. R. Lloyd et al., "Microporous Membrane Formation Via Thermally-Induced Phase Separation. II. Liquid-Liquid Phase Separation," Journal of Membrane Science, vol. 64, pp. 1-11 (1991).

K. Daijiten, Comprehensive Chemical Dictionary, Sixth Edition (reduced size), pp. 860 and 867.

D. Lloyd, "Microporous Membrane Formation Via Thermally Induced Phase Separation. I. Solid-Liquid Phase Separation," Journal of Membrane Science, vol. 52, pp. 239-261 (1990).

W. Hiatt et al., "Microporous Membranes Via Upper Critical Temperature Phase Separation," ACS Symp. Ser., vol. 269, pp. 229-244 (1985).

Office Action issued Apr. 23, 2010 in corresponding Chinese patent application.

* cited by examiner

POROUS MULTILAYERED HOLLOW-FIBER MEMBRANE AND PROCESS FOR PRODUCING THE SAME

CROSS-REFERENCE TO RELATED APPLICATIONS

This application is a national phase application of International Application No. PCT/JP2006/320251, filed Oct. 11, 2006, and claims the priority of Japanese Application Nos. 2005-298374, filed Oct. 13, 2005, and 2006-128119, filed May 2, 2006, the content of all of which is incorporated herein by reference.

TECHNICAL FIELD

The present invention relates to a porous hollow fiber membrane formed of a thermoplastic resin which has minute pores and high water permeability suitable for filtration and exhibits excellent strength, and a stable production thereof.

BACKGROUND ART

As a method of purifying river water for use as service water and the like, a filtration method utilizing a porous hollow fiber membrane which improves safety of treated water and reduces the installation space is being widely used. A porous hollow fiber membrane is required to exhibit high blocking performance which can reliably remove bacteria (e.g., cryptosporidium) and components making water turbid, high water permeability for treating a large quantity of water, and high strength which enables long-term use under a wide range of operating conditions (e.g., chemical washing and operation under high operating pressure).

A concept of obtaining a porous multilayer hollow fiber membrane which exhibits high blocking performance and high water permeability by bonding a blocking layer having a small pore diameter and a strength support layer having a large pore diameter is disclosed in Patent Document 1, for example. Specifically, Patent Document 1 discloses a method in which a crystalline thermoplastic resin such as polyethylene is melt-extruded without adding a solvent, and a porous multilayer hollow fiber membrane is produced from the resulting hollow fiber extruded product using a stretch pore-forming method. The term "stretch pore-forming method" refers to a method in which a hollow fiber extruded product is stretched in the longitudinal direction at a high stretch ratio to cleave the lamellar crystal stack to obtain a porous membrane (see Non-patent Document 1). In Patent Document 1, crystalline thermoplastic resins which differ in melt index (MI) are melt-extruded from two circular nozzles disposed concentrically. This is because the method disclosed in Patent Document 1 utilizes the property that resins which differ in MI (i.e., differ in molecular weight) have different pore diameters upon stretch pore-forming. As a result, a porous two-layer hollow fiber membrane in which the outer layer and the inner layer differ in pore diameter is obtained. However, a porous multilayer hollow fiber membrane exhibiting high strength cannot be obtained by the method due to the following problems.
(1) The strength of the porous multilayer hollow fiber membrane in the stretch axis direction is increased by stretching at a high stretch ratio. However, bursting strength and compressive strength (i.e., strength in the direction perpendicular to the stretch axis) important for filtration tend to decrease.
(2) In principle, the outer layer and the inner layer must differ in molecular weight or polymer type. However, required properties such as chemical resistance and mechanical strength differ depending on the molecular weight or polymer type. Therefore, when using a resin having low strength, the strength of the entire membrane decreases.

Therefore, a membrane exhibiting high strength cannot be obtained. Moreover, since a membrane obtained by this method has a structure in which the pore diameter in the longitudinal direction of the hollow fiber is larger than the pore diameter in the thickness direction, the membrane shows low bursting strength and low compressive strength.

Therefore, a porous multilayer hollow fiber membrane which exhibits high blocking performance, high water permeation rate, and high strength and a process for stably producing such a porous multilayer hollow fiber membrane have not yet been obtained.

A thermally induced phase separation method has been known as a method for producing a porous membrane. This method utilizes a thermoplastic resin and an organic liquid. The organic liquid serves as a latent solvent which does not dissolve the thermoplastic resin at room temperature, but dissolves the thermoplastic resin at a high temperature. In the thermally induced phase separation method, the thermoplastic resin and the organic liquid are mixed at a high temperature so that the thermoplastic resin is dissolved in the organic liquid. The mixture is then cooled to room temperature to induce phase separation. The organic liquid is then removed from the mixture to obtain a porous body. This method has the following advantages.
(a) A membrane can be easily produced using a polymer such as polyethylene for which an appropriate solvent which can dissolve the polymer at room temperature does not exist.
(b) Since the thermoplastic resin is dissolved at a high temperature and cooled to solidify and form a membrane. Therefore, particularly when the thermoplastic resin is a crystalline resin crystallization is promoted so that a high-strength membrane is easily obtained.

Therefore, the thermally induced phase separation method is widely used as a porous membrane production method (see Non-patent Documents 1 to 4, for example).
[Patent Document 1] JP-A-60-139815
[Patent Document 2] JP-A-3-215535
[Patent Document 3] JP-A-2002-56979
[Patent Document 4] JP-A-4-065505
[Non-patent Document 1] "Plastic and Functional Polymer Dictionary", pp. 672 to 679 (Industrial Research Center of Japan, February, 2004)
[Non-patent Document 2] Hideto Matsuyama, "Production of Polymer Porous Membrane by Thermally Induced Phase Separation (TIPS) method", Chemical Engineering, pp. 45 to 56 (Kagaku-Kogyo-Sha, June 1998)
[Non-patent Document 3] Akira Takizawa, "Membrane" pp. 404 to 406 (IPC, January 1992)
[Non-patent Document 4] D. R. Lloyd, et. al., Journal of Membrane Science, 64 (1991), pp. 1 to 11

DISCLOSURE OF THE INVENTION

Problems to be Solved by the Invention

An object of the present invention is to provide a porous hollow fiber membrane formed of a thermoplastic resin which has minute pores and high water permeability suitable for filtration and exhibits excellent strength, and a process for stably producing the porous hollow fiber membrane.

Means for Solving the Problem

In order to achieve the above object, the inventors of the present invention conducted extensive studies aimed at a porous multilayer hollow fiber membrane which advantageously has both minute pores and high water permeability by the thermally induced phase separation method (Non-patent Documents 1 to 4) which is considered to be advantageous for obtaining a high-strength membrane and at stably production of the porous multilayer hollow fiber membrane. As a result, the inventors found that it is very important to discharge molten mixtures which differ in composition from adjacent discharge ports and to incorporate an inorganic fine powder in the molten mixture discharged from at least one discharge port in order to stably spin (produce) a porous multilayer hollow fiber membrane and further improve the strength of the resulting porous multilayer hollow fiber membrane. The inventors also found that blocking performance, water permeability, and strength are effectively well-balanced using a porous multilayer hollow fiber membrane having at least two layers comprising an inner layer and an outer layer, the porous multilayer hollow fiber membrane being formed of a thermoplastic resin, at least one layer (A) of the above two layers having an isotropic three-dimensional mesh structure and a surface pore diameter 0.6 to 1.4 times a cross-sectional center pore diameter, and the other layer (B) of the above two layers having a surface pore diameter less than half of the cross-sectional center pore diameter.

Specifically, the present invention provides the following process and porous multilayer hollow fiber membrane.

(1) A process for producing a porous multilayer hollow fiber membrane by a hollow fiber molding nozzle with a circular discharge port, the process comprising discharging a molten mixture including a thermoplastic resin and an organic liquid from a circular discharge port of a hollow fiber molding nozzle to obtain a multilayer hollow fiber, and removing the organic liquid from the multilayer hollow fiber by extraction to obtain a porous multilayer hollow fiber membrane, the hollow fiber molding nozzle having two or more circular discharge ports which are disposed concentrically, molten mixtures which differ in composition being discharged from the adjacent discharge ports, the molten mixture discharged from at least one of the circular discharge ports further including an inorganic fine powder, and the inorganic fine powder being also removed from the resulting multilayer hollow fiber by extraction.

(2) The process for producing a porous multilayer hollow fiber membrane according to (1), wherein the thermoplastic resin, the organic liquid, and further the inorganic fine powder are mixed in at least a molten mixture which is discharged in a largest amount among the molten mixtures discharged from the circular discharge ports.

(3) The process for producing a porous multilayer hollow fiber membrane according to (1) or (2), wherein the inorganic fine powder is a silica fine powder.

(4) The process for producing a porous multilayer hollow fiber membrane according to any one of (1) to (3), wherein the molten mixture discharged from a circular discharge port includes the inorganic fine powder in an amount of 5 mass % or more and 40 mass % or less.

(5) The process for producing a porous multilayer hollow fiber membrane according to any one of (1) to (4), wherein a mass ratio D of the organic liquid and a mass ratio S of the inorganic fine powder with respect to the molten mixture and a maximum mass M of the organic liquid absorbed by the inorganic fine powder per unit mass satisfy $0.2 \leq (D/S)/M \leq 2$.

(6) The process for producing a porous multilayer hollow fiber membrane according to any one of (1) to (5), wherein the molten mixtures discharged from the adjacent circular discharge ports include at least one common organic liquid.

(7) The process for producing a porous multilayer hollow fiber membrane according to any one of (1) to (5), wherein organic liquids contained in the molten mixtures discharged from the adjacent circular discharge ports are the same in kind but differ in ratio.

(8) The process for producing a porous multilayer hollow fiber membrane according to any one of (1) to (7), wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

(9) The process for producing a porous multilayer hollow fiber membrane according to any one of (1) to (8), wherein the multilayer hollow fiber is stretched in a longitudinal direction of the hollow fiber at a stretch ratio of 1.1 or more and 3 or less before or after removing the organic liquid and/or the inorganic fine powder by extraction.

(10) The process for producing a porous multilayer hollow fiber membrane according to any one of (1) to (9), wherein the thermoplastic resin is selected from a polyolefin and polyvinylidene fluoride.

(11) A porous multilayer hollow fiber membrane comprising at least two layers i.e., an inner layer and an outer layer, the porous multilayer hollow fiber membrane being formed of a thermoplastic resin, at least one layer (A) among the two layers having an isotropic three-dimensional mesh structure and a surface pore diameter 0.6 to 1.4 times a cross-sectional center pore diameter, and the other layer (B) among the two layers having a surface pore diameter less than half of the cross-sectional center pore diameter.

(12) The porous multilayer hollow fiber membrane according to (11), wherein the layer (B) has an isotropic three-dimensional mesh structure.

(13) The porous multilayer hollow fiber membrane according to (11) or (12), wherein the layer (B) has a surface pore diameter of 0.01 μm or more and less than 5 μm.

(14) The porous multilayer hollow fiber membrane according to any one of (11) to (13), wherein the cross-sectional center pore diameter is 0.1 μm or more and 10 μm or less.

(15) The porous multilayer hollow fiber membrane according to any one of (11) to (14), wherein the layer (B) has a surface porosity of 20% or more and 80% or less.

(16) The porous multilayer hollow fiber membrane according to any one of (11) to (15), wherein the layer (B) has a thickness of $1/100$ or more and $40/100$ or less of the thickness of the porous multilayer hollow fiber membrane.

(17) The porous multilayer hollow fiber membrane according to any one of (11) to (16), wherein the layer (A) and the layer (B) both have a degree of isotropy of 80% or more.

(18) The porous multilayer hollow fiber membrane according to any one of (11) to (17), wherein the number of parameters Q which satisfy $-0.2 \leq Q \leq 0.2$ is 80% or more of the total number of parameters Q measured values, the parameter Q being a value which indicates a pore diameter change rate at each position from an outer surface to an inner surface of the porous multilayer hollow fiber membrane in its thickness direction.

(19) The porous multilayer hollow fiber membrane according to any one of (11) to (18), wherein the thermoplastic resin is selected from a polyolefin and polyvinylidene fluoride.

(20) The porous multilayer hollow fiber membrane according to any one of (11) to (19), wherein the porous multilayer hollow fiber membrane has an inner diameter of 0.4 mm or more and 5 mm or less and a thickness of 0.2 mm or more and 1 mm or less.

(21) A porous multilayer hollow fiber membrane produced by the process according to any one of (1) to (10).
(22) The porous multilayer hollow fiber membrane according to any one of (11) to (20), the porous multilayer hollow fiber membrane being produced by the process according to any one of (1) to (10).

EFFECT OF THE INVENTION

According to the present invention, a porous hollow fiber membrane formed of a thermoplastic resin which has both minute pores and high water permeability suitable for filtration and exhibits excellent strength can be stably produced.

BRIEF DESCRIPTION OF THE DRAWINGS

FIG. 1(a) is a cross-sectional view along a plane horizontal to a discharge direction, FIG. 1(b) is a view opposite to a nozzle discharge port, and FIG. 1(c) is a cross-sectional view showing a two-layer hollow fiber extruded product along a plane perpendicular to an extrusion direction.

Figure 1:
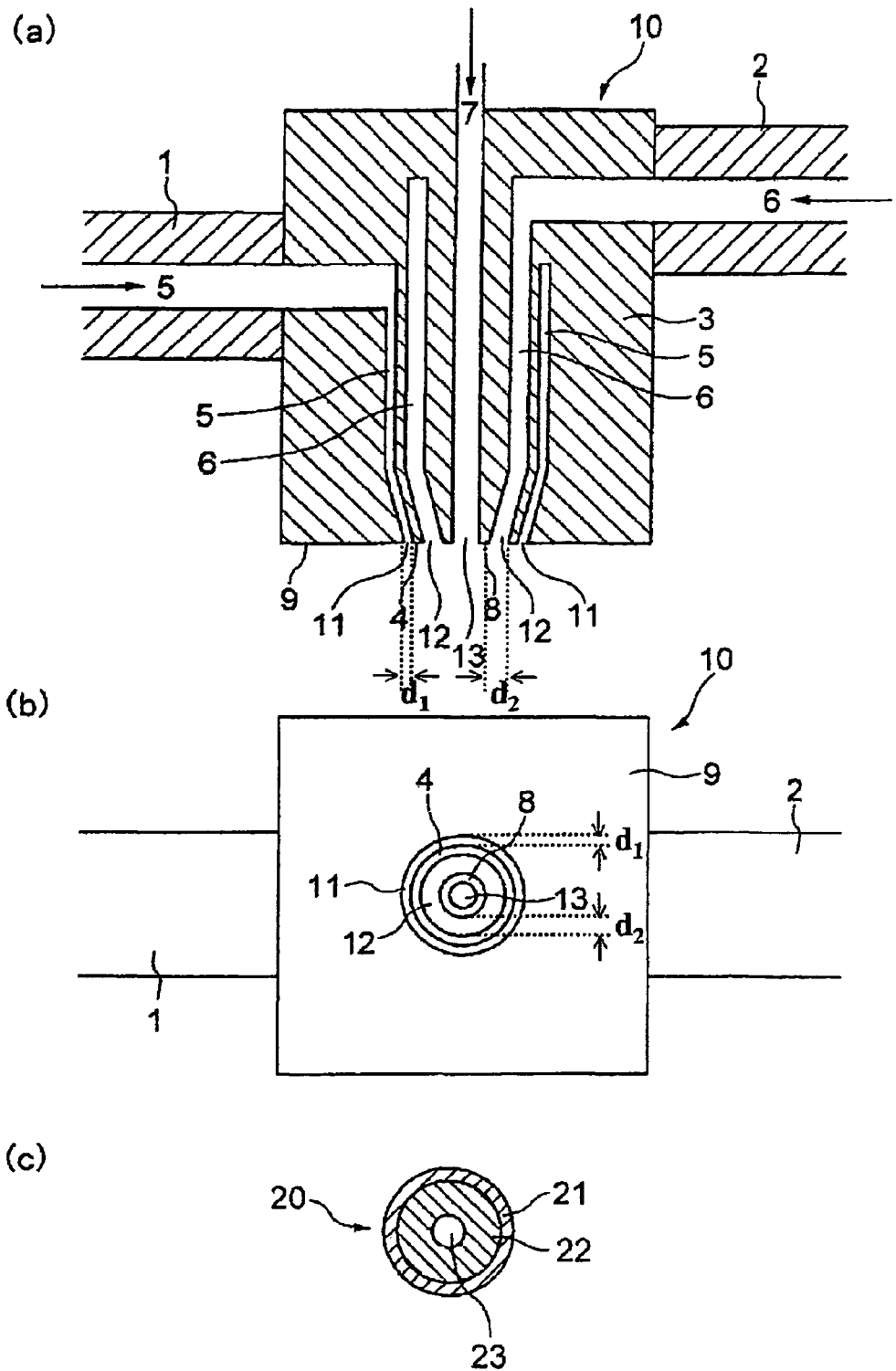
FIG. 1 is a view showing an example of a two-layer hollow fiber molding nozzle.

| EXPLANATION OF SYMBOLS | |
|---|---|
| 1: | End of extruder A (for outer layer) |
| 2: | End of extruder B (for inner layer) |
| 3: | Hollow fiber molding nozzle |
| 4: | Lower end of partition wall between outer-layer molten mixture discharge port and inner-layer molten mixture discharge port |
| 5: | Space in which outer-layer molten mixture flows |
| 6: | Space in which inner-layer molten mixture flows |
| 7: | Passage for hollow-portion-forming fluid |

-continued

| | EXPLANATION OF SYMBOLS |
|---|---|
| 8: | Lower end of partition wall between inner-layer molten mixture discharge port and hollow-portion-forming fluid discharge port |
| 9: | Nozzle lower surface |
| 10: | Production device |
| 11: | Circular discharge port for outer-layer molten mixture |
| 12: | Circular discharge port for inner-layer molten mixture |
| 13: | Hollow-portion-forming fluid discharge port |
| 20: | Extruded product (cross section) |
| 21: | Outer layer |
| 22: | Inner layer |
| 23: | Hollow portion |
| 30: | Production device |
| 31: | Lower end of partition wall between outer-layer molten mixture discharge port and inner-layer molten mixture discharge port |
| 32: | Lower end of partition wall between inner-layer molten mixture discharge port and hollow-portion-forming fluid discharge port |

BEST MODE FOR CARRYING OUT THE INVENTION

The present invention is described in detail below.

A thermoplastic resin exhibits elasticity, but not plasticity at room temperature. However, it exhibits plasticity when heated to an appropriate temperature to allow molding. The thermoplastic resin again exhibits elasticity when cooled, and does not undergo a chemical change in molecular structure and the like during this process (Kagaku Daijiten (Comprehensive Chemical Dictionary), sixth edition (reduced size), pp. 860 and 867 (Kyoritsu Shuppan Co., Ltd., 1963).

Examples of the thermoplastic resin include thermoplastic resins described in "12695 Chemical Products", pp. 829 to 882 (The Chemical Daily Co., Ltd., 1995), resins described in Kagaku Binran, Ouyou Kagaku, pp. 809 and 810 (edited by The Chemical Society of Japan, Maruzen, 1980), and the like. Specific examples of the thermoplastic resin include polyolefins such as polyethylene and polypropylene, polyvinylidene fluoride, an ethylene-vinyl alcohol copolymer, polyamide, polyetherimide, polystyrene, polysulfone, polyvinyl alcohol, polyphenylene ether, polyphenylene sulfide, cellulose acetate, polyacrylonitrile, and the like. In particular, a crystalline thermoplastic resin such as polyethylene, polypropylene, polyvinylidene fluoride, an ethylene-vinyl alcohol copolymer, or polyvinyl alcohol may be suitably used from the viewpoint of strength. It is preferable to use a polyolefin, polyvinylidene fluoride, or the like which exhibits excellent water resistance due to hydrophobicity and is expected to exhibit durability when filtering a normal aqueous liquid. It is particularly preferable to use polyvinylidene fluoride due to excellent chemical durability (e.g., chemical resistance). Examples of polyvinylidene fluoride include a vinylidene fluoride homopolymer and a vinylidene fluoride copolymer having a vinylidene fluoride content of 50 mol % or more. Examples of the vinylidene fluoride copolymer include a copolymer of vinylidene fluoride and one or more monomers selected from tetrafluoroethylene, hexafluoropropylene, trifluoroethylene chloride, and ethylene. A vinylidene fluoride homopolymer is most preferable as polyvinylidene fluoride.

As the organic liquid, a latent solvent for the thermoplastic resin used in the present application is used. The term "latent solvent" used in the present application refers to a solvent which rarely dissolves the thermoplastic resin at room temperature (25° C.), but dissolves the thermoplastic resin at a temperature higher than room temperature. It suffices that the organic liquid be liquid at the melt-mixing temperature of the thermoplastic resin. The organic liquid need not necessarily be liquid at room temperature.

When the thermoplastic resin is polyethylene, examples of the organic liquid include phthalates such as dibutyl phthalate, diheptyl phthalate, dioctyl phthalate, bis(2-ethylhexyl) phthalate, diisodecyl phthalate, and ditridecyl phthalate; sebacates such as dibutyl sebacate; adipates such as dioctyl adipate; trimellitates such as trioctyl trimellitate; phosphates such as tributyl phosphate and trioctyl phosphate; glycerol esters such as propylene glycol dicaprate and propylene glycol dioleate; paraffins such as liquid paraffins; a mixture of these; and the like.

When the thermoplastic resin is polyvinylidene fluoride, examples of the organic liquid include phthalates such as dimethyl phthalate, diethyl phthalate, dibutyl phthalate, dicyclohexyl phthalate, diheptyl phthalate, dioctyl phthalate, and bis(2-ethylhexyl) phthalate; benzoates such as methyl benzoate and ethyl benzoate; phosphates such as triphenyl phosphate, tributyl phosphate, and tricresyl phosphate; ketones such as γ-butyrolactone, ethylene carbonate, propylene carbonate, cyclohexanone, acetophenone, and isophorone; a mixture of these; and the like.

Examples of the inorganic fine powder include silica, alumina, titanium oxide, zirconia, calcium carbonate, and the like. It is preferable to use a silica fine powder having an average primary particle diameter of 3 nm or more and 500 nm or less. The average primary particle diameter is more preferably 5 nm or more and 100 mm or less. It is more preferable to use a hydrophobic silica fine powder which is hard to aggregate and exhibits excellent dispersibility. Hydrophobic silica having a methanol wettability (MW) value of 30 vol % or more is still more preferable. The term "MW value" used herein refers to the content (vol %) of methanol with which the powder is completely wetted. The MW value is determined as follows. Specifically, silica is placed in pure water, and methanol is then added to the mixture below the liquid surface with stirring. The content (vol %) of methanol in the aqueous solution when 50 mass % of silica has precipitated is determined to be the MW value.

The inorganic fine powder is preferably added so that the content of the inorganic fine powder in the molten mixture is 5 mass % or more and 40 mass % or less. If the content of the inorganic fine powder is 5 mass % or more, an effect of mixing the inorganic fine powder can be sufficiently achieved. If the content of the inorganic fine powder is 40 mass % or less, a stable spinning operation can be ensured.

The mixing ratio during melt-mixing is preferably determined so that the content of the thermoplastic resin is 15 to 50 vol % and the total content of the organic liquid and the inorganic fine powder is 50 to 85 vol % from the viewpoint of the balance between the water permeability and the strength of the resulting hollow fibers and stability of the spinning operation (i.e., melt-extrusion operation) (the mixing ratio is indicated by a value obtained by dividing mass by specific gravity). The content of the thermoplastic resin is preferably 15 vol % or more from the viewpoint of the strength of the resulting porous multilayer hollow fiber membrane and spinning stability. The content of the thermoplastic resin is preferably 50 vol % or less from the viewpoint of the water permeability of the resulting porous multilayer hollow fiber membrane and spinning stability.

The thermoplastic resin, the organic liquid, and the inorganic fine powder may be melt-mixed using a normal melt-mixing means such as a twin-screw extruder. A hollow fiber molding nozzle having two or more circular discharge ports disposed concentrically is attached to the end of the extruder.

Figure 2:
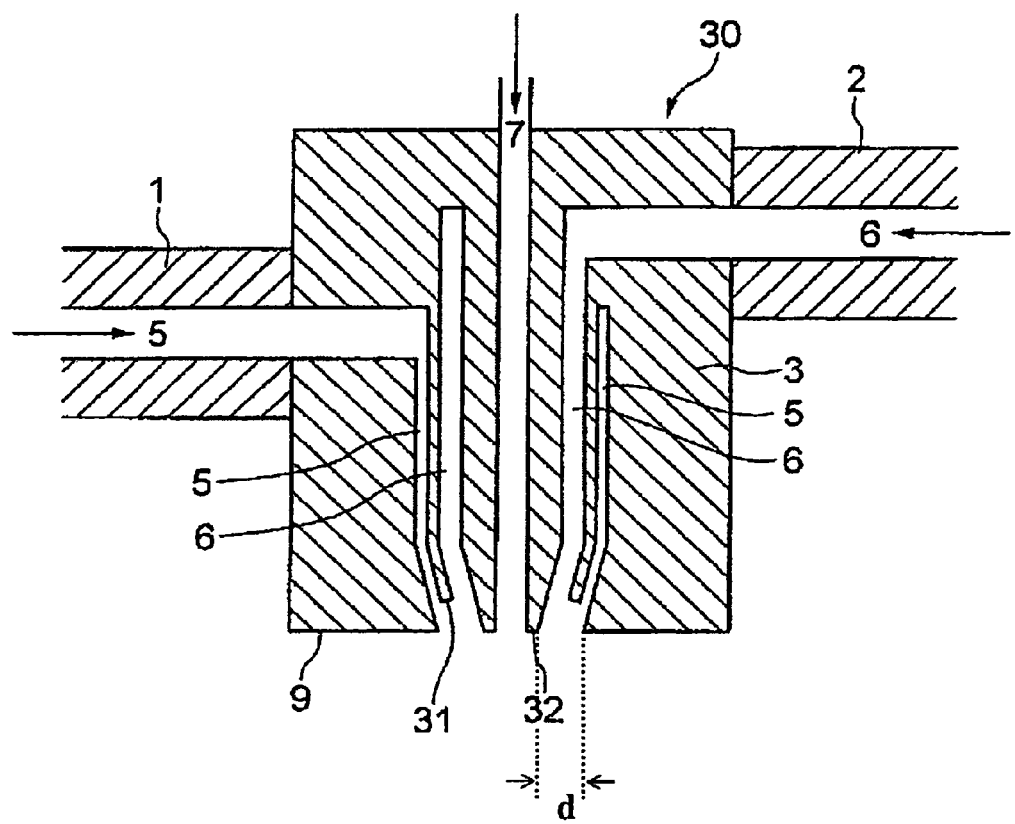
FIG. 2 is a view showing another example of a two-layer hollow fiber molding nozzle.

Molten mixtures are respectively supplied to and extruded from to the circular discharge ports from different extruders. Molten mixtures supplied from the different extruders are merged through the discharge ports to obtain a hollow fiber extruded product having a multilayer structure. In this case, a multilayer membrane in which the adjacent layers differ in pore size can be obtained by extruding molten mixtures which differ in composition from the adjacent circular discharge ports. The expression "differ in composition" refers to the case where the molten mixtures differ in constituent substance or the case where the molten mixtures contain the same constituent substances but differ in the ratio thereof. When the molten mixtures contain the same type of thermoplastic resins which differ in molecular weight or molecular weight distribution, the molten mixtures are considered to differ in constituent substance. FIGS. 1 and 2 are schematic views showing a multilayer hollow fiber extruded product production process by multilayer melt-extrusion when the number of layers is two. The merging point of the molten mixtures which differ in composition may be the lower end face of the hollow fiber molding nozzle (FIG. 1) or a position differing from the lower end face of the hollow fiber molding nozzle (FIG. 2). It is preferable to use the nozzle shown in FIG. 2 which causes the molten mixtures to merge before passing through the lower end face of the nozzle (i.e., before being cooled and undergoing phase separation) from the viewpoint of interlayer adhesion.

When using the hollow fiber molding nozzle having two or more circular discharge ports disposed concentrically, as shown in FIGS. 1 and 2, a molten mixture in which the thermoplastic resin, the organic liquid, and the inorganic fine powder are mixed can be extruded from at least one circular discharge port. As a result, a porous multilayer hollow fiber membrane which exhibits blocking performance, water permeability, and strength in a well-balanced manner can be easily obtained.

A porous multilayer hollow fiber membrane exhibiting excellent performance can be stably obtained by adding the inorganic fine powder due to the following three specific effects.

(1) The extrusion stability (spinning stability) of the hollow fiber extruded product having a multilayer structure is significantly improved. This is because the viscosity of the molten mixture increases to a large extent by adding the inorganic fine powder. Multilayer extrusion tends to become unstable as compared with single-layer extrusion. In the present invention, since at least one layer to be bonded has a high viscosity to form a hard layer, stability is achieved. Specifically, a multilayer hollow fiber extruded product in which non-uniformity at the layer interface is suppressed can be easily obtained while maintaining roundness. It is important for multilayer extrusion to suppress non-uniformity (e.g., waving) at the layer interface.

(2) Since the pore size distribution becomes sharp, a membrane which exhibits blocking performance, water permeability, and strength in a well-balanced manner can be obtained. Specifically, since the molten mixture has a high viscosity or the aggregate of the inorganic fine powder absorbs the organic liquid, a situation in which the organic liquid enters the adjacent layer is suppressed. When the organic liquid enters from the adjacent layer, the inorganic fine powder absorbs the organic liquid (i.e., functions as a buffer). The movement of the organic liquid is suppressed due to high viscosity, or a change in the membrane structure due to mixing of the organic liquids between the layers is reduced.

(3) When the inorganic fine powder is added to at least one layer, the mechanical strength and the chemical strength (chemical resistance) of the membrane tend to increase before or after extraction/removal of the organic liquid and the inorganic fine powder (although the reason is not known).

The above three effects are improved when the molten mixture which is discharged in the largest amount contains the inorganic fine powder. It is preferable that all of the molten mixtures to be discharged contain the inorganic fine powder.

When the molten mixture containing the inorganic fine powder has such a composition that a value obtained by dividing a mass ratio D of the organic liquid by a mass ratio S of the inorganic fine powder and further dividing the resulting value by a maximum mass M of the organic liquid absorbed by the inorganic fine powder per unit mass is 0.2 or more and 2 or less, the effect of suppressing the movement of the organic liquid between the molten mixtures can be further improved. The term "organic liquid" used herein refers to an organic liquid having the same composition as that of the organic liquid contained in the molten mixture, i.e., an organic liquid comprising sole component or plural components at the same mixing ratio as that of the organic liquid contained in the molten mixture. If the above value is 0.2 or more, the movement of the organic liquid from the adjacent layer in the vicinity of the layer interface is suppressed so that a dense layer is not formed, whereby a high pure water permeation rate is maintained. If the above value is 2 or less, the amount of the organic liquid which is not absorbed by the inorganic fine powder is sufficiently small. Therefore, the movement of the organic liquid in the vicinity of the interface occurs to only a small extent. This reduces a change in the membrane structure, whereby blocking performance is maintained. The above value is more preferably 0.3 or more and 1.5 or less, and still more preferably 0.4 or more and 1.0 or less. This effect is also preferably improved when the molten mixture which is discharged in the largest amount contains the inorganic fine powder. It is more preferable that all of the molten mixtures to be discharged contain the inorganic fine powder. The term "maximum mass M of the organic liquid absorbed by the inorganic fine powder per unit mass" may be determined by adding the organic liquid dropwise to the inorganic fine powder while mixing the inorganic fine powder, and dividing the mass of the organic liquid when the mixing torque has reached 70% of the maximum torque by the mass of the inorganic fine powder.

It is preferable that at least one common organic liquid be mixed into the two adjacent molten mixtures, since an effect of a change in structure when the movement of the organic liquid occurs between the molten mixtures is reduced. It is more preferable that the same type of organic liquid be mixed into the adjacent molten mixtures in different ratios. When the same type of organic liquid is mixed into the adjacent molten mixtures, the extracted organic liquid can be easily recovered.

The difference in resin temperature when causing the adjacent molten mixtures to merge is preferably 20° C. or less. If the difference in resin temperature is 20° C. or less, densification or void formation rarely occurs at the interface between the molten mixtures. As a result, a membrane exhibiting excellent water permeability and strength can be obtained. The difference in resin temperature when causing the adjacent molten mixtures to merge is more preferably 10° C. or less, and still more preferably 0° C.

When extruding the molten mixture from the circular discharge port, it is preferable to discharge the molten mixture so that a spinning nozzle discharge parameter R (1/second) is 10 or more and 1000 or less, since a membrane having high strength can be obtained while achieving high productivity and high spinning stability. The term "spinning nozzle discharge parameter R" refers to a value obtained by dividing a discharge linear velocity V (m/sec) by a slit width d (m) of the discharge port. The term "discharge linear velocity V (m/sec)" refers to a value obtained by dividing the amount ($m^3$/second) of the molten mixture discharged per unit time by the cross-sectional area ($m^2$) of the discharge port. If the spinning nozzle discharge parameter R is 10 or more, a problem such as a change (pulsation) in the diameter of the hollow extruded product does not occur so that the spinning operation can be stably performed with high productivity. If the spinning nozzle discharge parameter R is 1000 or less, the elongation at break (important strength) of the resulting porous multilayer hollow fiber membrane can be maintained at a sufficiently high level. The term "elongation at break" refers to the elongation with respect to the original length when pulling the membrane in the longitudinal direction. When the molten mixtures merge before being discharged (see spinning nozzle shown in FIG. 2), a value obtained by dividing the discharge linear velocity V of the merged molten mixtures at a lower end face 9 shown in FIG. 2 by the slit width d of the discharge port is employed as the spinning nozzle discharge parameter R. When the molten mixtures merge when or after being discharged (see spinning nozzle shown in FIG. 1), the spinning nozzle discharge parameters R1 and R2 are respectively calculated for the slit widths d1 and d2 of the circular discharge ports 11 and 12 at the lower end face 9 shown in FIG. 1. In this case, it is preferable that at least one spinning nozzle discharge parameter R be 10 or more and 1000 or less. It is more preferable that the spinning nozzle discharge parameter R of which the amount of discharge is largest be 10 or more and 1000 or less. It is still more preferable that the spinning nozzle discharge parameters R of all of the circular discharge ports be 10 or more and 1000 or less. The spinning nozzle discharge parameter R is more preferably 50 or more and 800 or less, and still more preferably 100 or more and 500 or less.

The number of layers and the ratio of the pore size or the thickness of the layers may be appropriately set depending on the objective. For example, when forming a two-layer filter membrane, (i) a combination of a thin outer layer having a small pore diameter and a thick inner layer having a large pore diameter, or (ii) a combination of a thick outer layer having a large pore diameter and a thin inner layer having a small pore diameter is effective for providing minute pores and high water permeability. When forming a three-layer filter membrane, (iii) a combination of a thin outer layer having a small pore diameter, a thin inner layer having a small pore diameter), and a thick intermediate layer having a large pore diameter, or (iv) a combination of a thick outer layer having a large pore diameter, a thick inner layer having a large pore diameter, and a thin intermediate layer having a small pore diameter is effective for providing minute pores and high water permeability.

The hollow fiber molten mixtures extruded from the discharge ports to have a multilayer structure are cooled and solidified through the air or a refrigerant such as water, and are wound around a reel, as required. Thermally induced phase separation occurs during cooling. Polymer rich-phases and organic liquid rich-phases are minutely distributed in the hollow fiber after cooling and solidification. When the inorganic fine powder is a silica fine powder, the silica fine powder is unevenly distributed in the organic liquid rich phase. The organic liquid rich-phases form pores by removing the organic liquid and the inorganic fine powder by extraction from the hollow fiber which has been cooled and solidified. A porous multilayer hollow fiber membrane can be thus obtained.

The organic liquid and the inorganic fine powder may be removed by extraction at the same time when the organic liquid and the inorganic fine powder can be extracted with the same solvent. The organic liquid and the inorganic fine powder are normally removed separately.

The organic liquid is removed by extraction using a liquid appropriate for extraction which does not dissolve or modify the thermoplastic resin used, but which is mixed with the organic liquid. Specifically, the organic liquid may be extracted by contact such as immersion. It is preferable that the liquid used for extraction be volatile so that the liquid can be easily removed from the hollow fiber membrane after extraction. Examples of such a liquid include an alcohol, methylene chloride, and the like. When the organic liquid is water-soluble, water may be used as the extraction liquid.

The inorganic fine powder is normally removed by extraction using an aqueous liquid. For example, when the inorganic fine powder is silica, silica may be converted into a silicate through contact with an alkaline solution, and the silicate is then removed by extraction through contact with water.

The organic liquid and the inorganic fine powder may be removed by extraction in an arbitrary order. When the organic liquid is immiscible with water, it is preferable to remove the organic liquid by extraction, and then remove the inorganic fine powder by extraction. Since the organic liquid and the inorganic fine powder are normally present in the organic liquid rich-phase in a mixed state, the inorganic fine powder can be smoothly removed by extraction.

A porous multilayer hollow fiber membrane can be obtained by removing the organic liquid and the inorganic fine powder by extraction from the multilayer hollow fiber which has been cooled and solidified.

The multilayer hollow fiber which has been cooled and solidified may be stretched in the longitudinal direction at a stretch ratio of 3 or less (i) before removing the organic liquid and the inorganic fine powder by extraction, (ii) after removing the organic liquid by extraction, but before removing the inorganic fine powder by extraction, (iii) after removing the inorganic fine powder by extraction, but before removing the organic liquid by extraction, or (i) after removing the organic liquid and the inorganic fine powder by extraction. The water permeability of the multilayer hollow fiber membrane is generally improved by stretching the multilayer hollow fiber membrane in the longitudinal direction. On the other hand, since the pressure withstand performance (bursting strength and compressive strength) decreases, the stretched membrane may not have a practical strength. However, the porous multilayer hollow fiber membrane obtained by the production process according to the present invention has a high mechanical strength. Therefore, the multilayer hollow fiber may be stretched at a stretch ratio of 1.1 or more and 3 or less. The water permeability of the porous multilayer hollow fiber membrane is improved by stretching the porous multilayer hollow fiber membrane. The term "stretch ratio" used herein refers to a value obtained by dividing the length of the hollow fiber after stretching by the length of the hollow fiber before stretching. For example, when stretching a multilayer hollow fiber having a length of 10 cm to a length of 20 cm, the stretch ratio is two according to the following expression.

$$20\text{ cm} \div 10\text{ cm} = 2$$

The compressive strength of the membrane may be optionally increased by subjecting the stretched membrane to a heat treatment. The heat treatment temperature is normally equal to or less than the melting point of the thermoplastic resin.

The porous multilayer hollow fiber membrane according to the present invention which exhibits blocking performance, water permeability, and strength in a well-balanced manner is a multilayer membrane which includes at least two layers and is formed of the thermoplastic resin.

The porous multilayer hollow fiber membrane according to the present invention is described below with reference to a schematic view showing a porous two-layer hollow fiber membrane (see FIG. 5).

A layer having a larger pore diameter is referred to as a layer (A), and a layer having a smaller pore diameter is referred to as a layer (B). The layer (A) is referred to as an inner layer, and the layer (B) is referred to as an outer layer. Note that the present invention is not limited thereto. For example, another layer may be provided between the layer (A) and the layer (B), or another layer may be stacked on the layer (A) or the layer (B).

Figure 5:
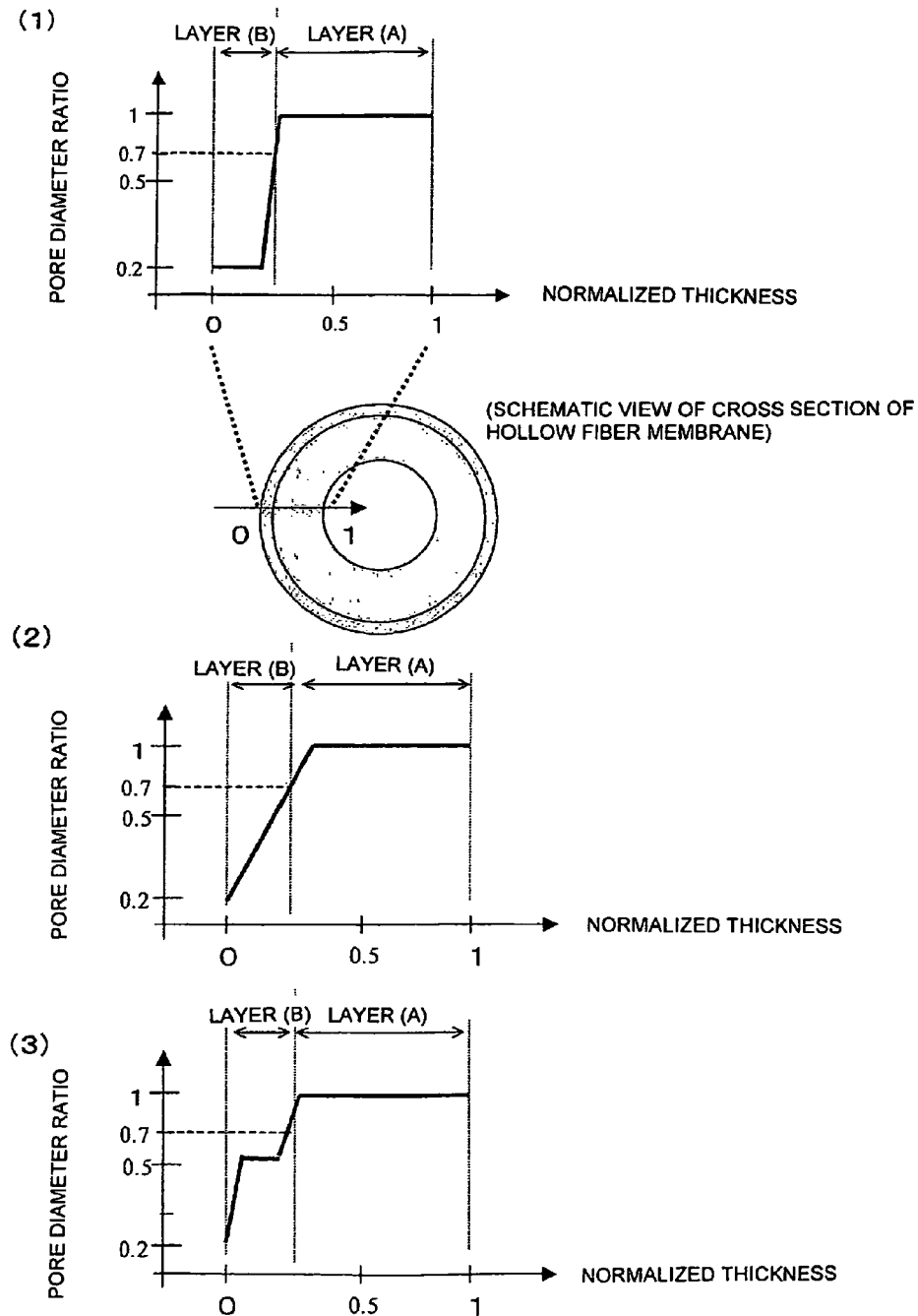
FIG. 5 is a schematic view showing an example of a change in pore diameter in the thickness direction of a porous two-layer hollow fiber membrane.

FIG. 5(1) is a view showing a change in pore diameter in the thickness direction when the layer (A) and the layer (B) have an isotropic three-dimensional mesh structure. FIG. 5(2) is a view showing a change in pore diameter when the layer (B) has an anisotropic three-dimensional mesh structure. FIG. 5(3) is a view showing a change in pore diameter when a layer (skin layer) having a small pore diameter is formed on the outer surface in FIG. 5(1). FIGS. 5(1) to 5(3) give graphs showing the relationship between the thickness and the pore diameter along the cross section of each hollow fiber membrane. In each graph, the vertical axis indicates the ratio of the pore diameter at each cross-section to the cross-sectional center pore diameter, and the horizontal axis indicates the distance from the outer surface to a position in the thickness direction provided that the total thickness is one. It is preferable that the layer (A) and the layer (B) have an isotropic three-dimensional mesh structures since the blocking performance changes to only a small extent even if surface wear occurs.

The layer (A) is a support layer. The support layer ensures a high mechanical strength such as pressure withstand performance, and maintains water permeability as high as possible.

The layer (A) has an isotropic three-dimensional mesh structure. The term "isotropic" used herein means that a change in pore diameter is small (i.e., almost homogeneous structure) in the thickness direction, the circumferential direction, and the longitudinal direction of the membrane. The isotropic structure is a structure in which a portion having a low strength such as a macro-void rarely occurs. Therefore, the mechanical strength (e.g., pressure withstand performance) of the porous multilayer hollow fiber membrane can be increased while maintaining the water permeability of the porous multilayer hollow fiber membrane.

Figure 3:
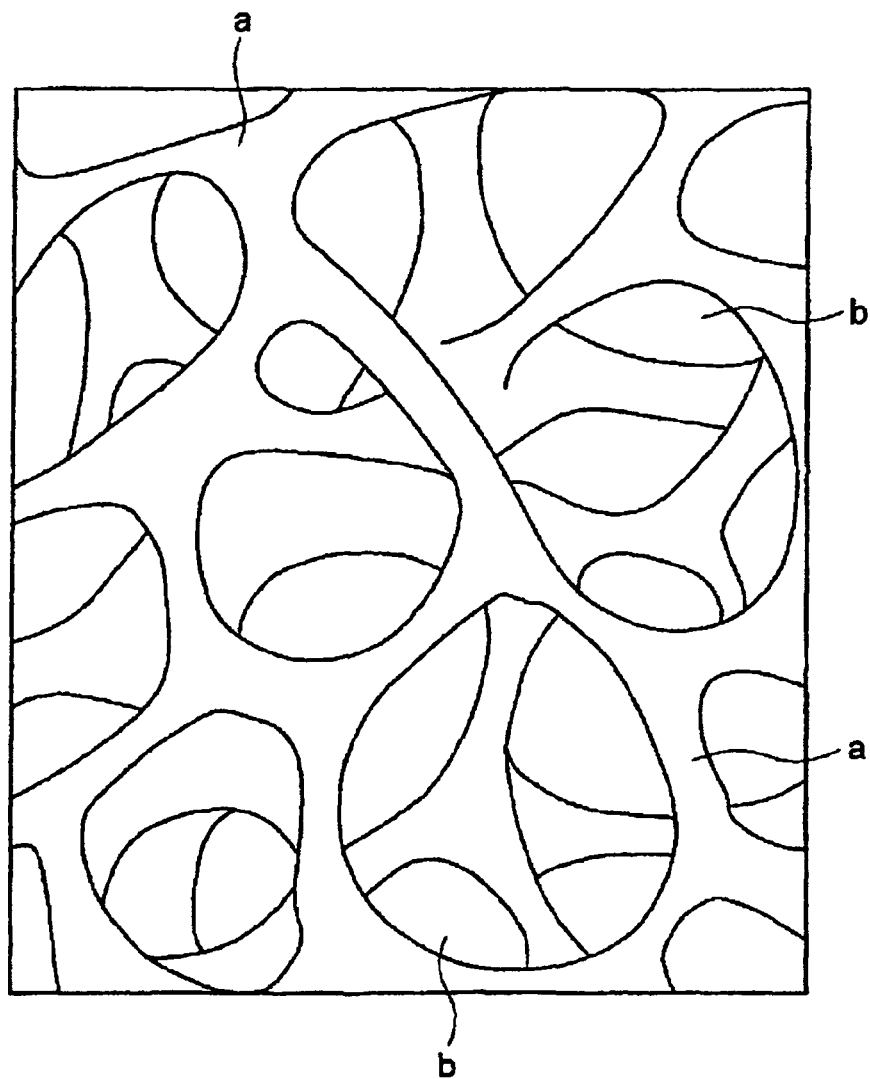
FIG. 3 is a schematic view showing an isotropic three-dimensional mesh structure.
Figure 4:
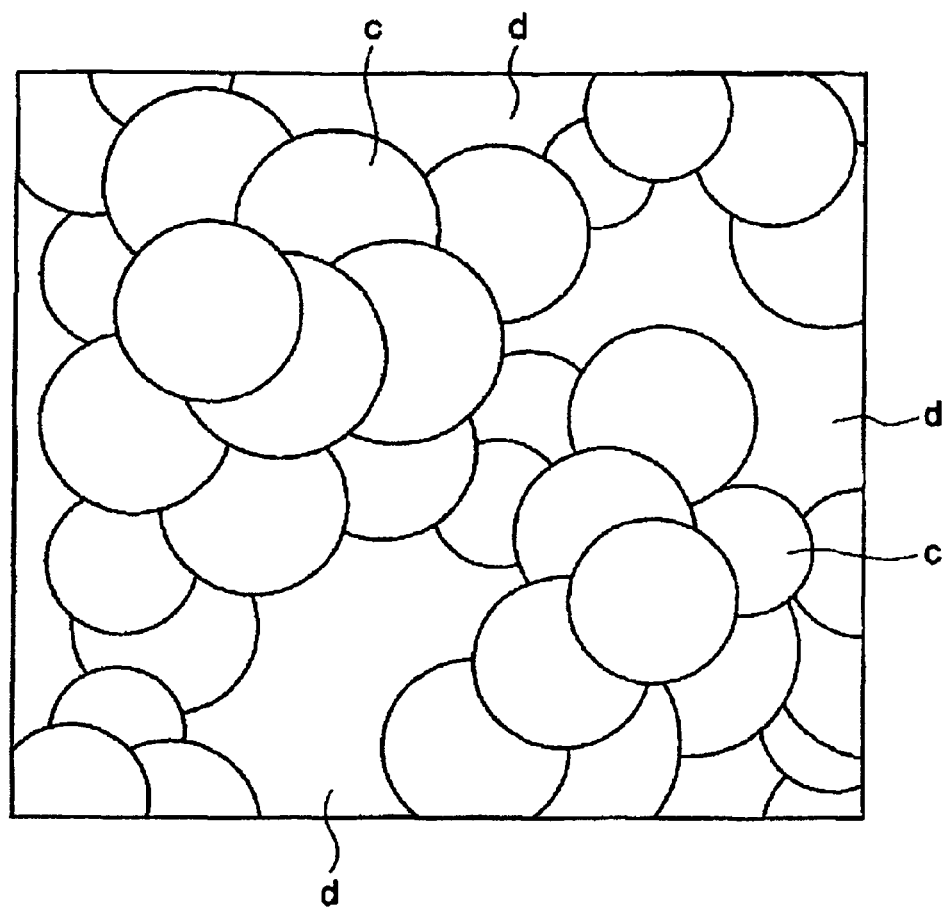
FIG. 4 is a schematic view showing a spherulite structure.
Figure 9:
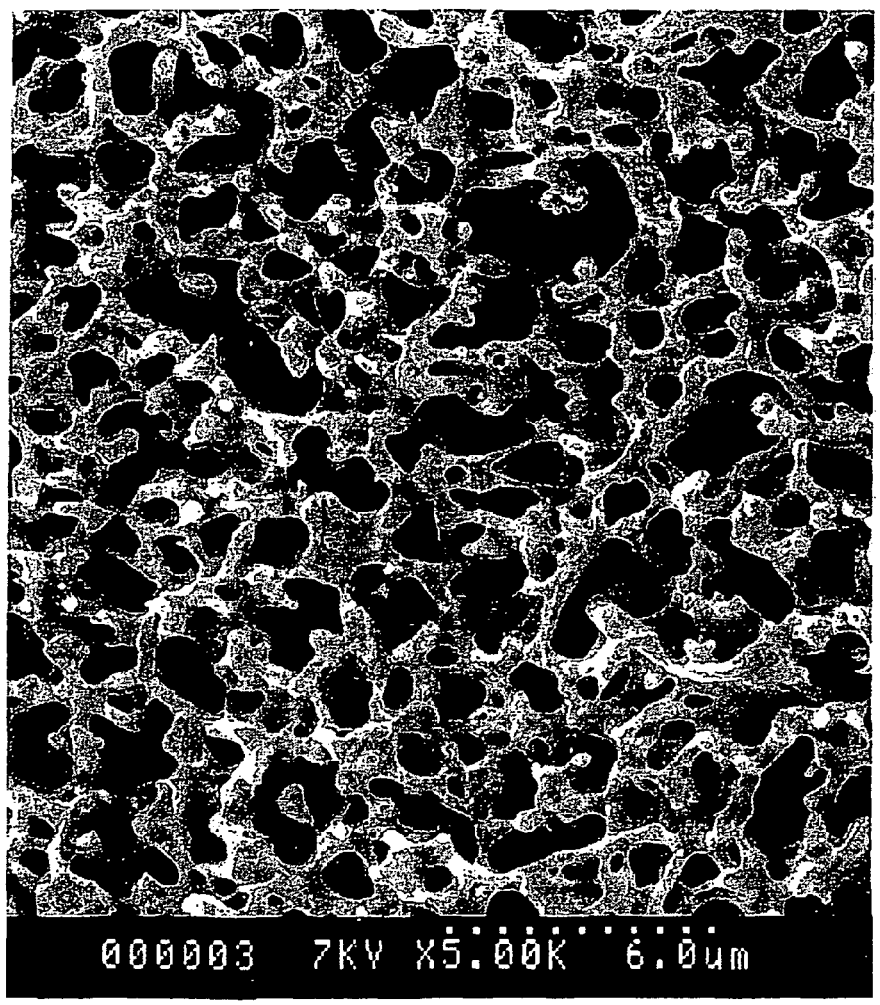
FIG. 9 shows an electron micrograph (magnification: 5000) of the center of a cross section of a porous two-layer hollow fiber membrane obtained in Example 1.
Figure 23:
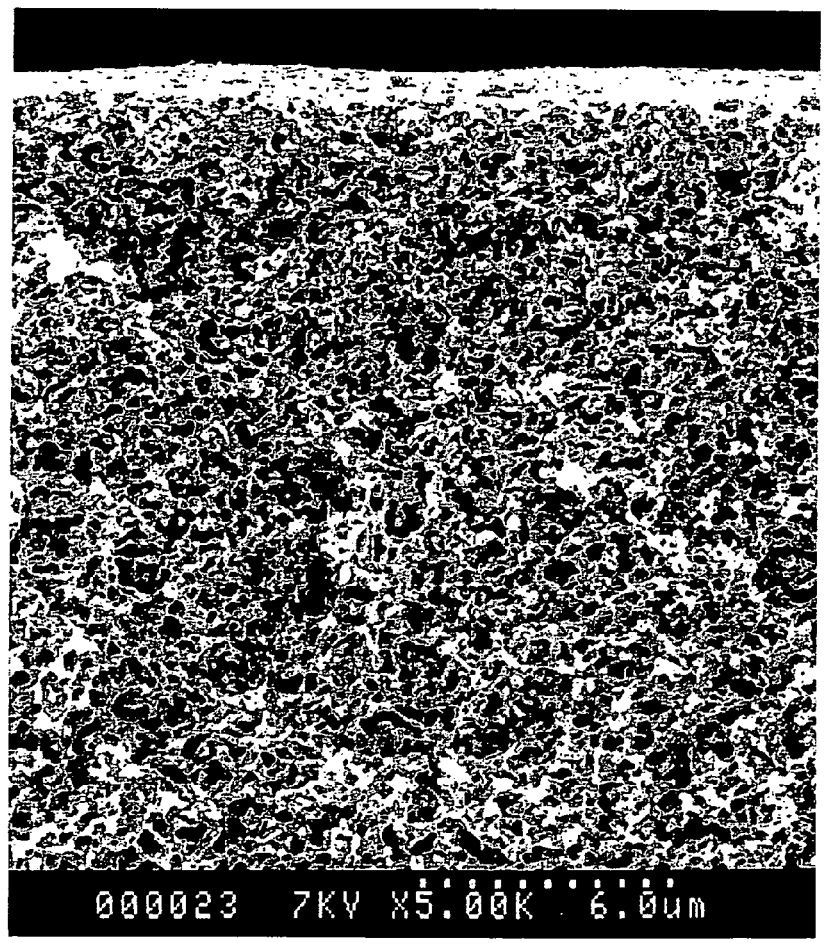
FIG. 23 shows an electron micrograph (magnification: 5000) of a cross section around the outer surface of a porous two-layer hollow fiber membrane obtained in Comparative Example 2.

The term "three-dimensional mesh structure" used herein refers to a structure schematically shown in FIG. 3. As shown in FIG. 3, thermoplastic resins a are connected to form a mesh so that openings b are formed. FIG. 9 shows an example of a microscope image of the isotropic three-dimensional mesh structure of a porous two-layer hollow fiber membrane obtained in Example 1. The thickness of the thermoplastic resin which forms the mesh is almost constant. In this three-dimensional mesh structure, a resin block having a spherulite structure schematically shown in FIG. 4 is rarely observed. The opening of the three-dimensional mesh structure is enclosed by the thermoplastic resin, and each section of the opening communicates. Since most of the thermoplastic resin used forms a three-dimensional mesh structure which can contribute to the strength of the hollow fiber membrane, a support layer having a high strength can be formed. Moreover, chemical resistance increases. The reason that chemical resistance increases is not clear, but is considered to be as follows. Specifically, since a large amount of thermoplastic resin forms a mesh which can contribute to strength, the strength of the entire layer is not affected even if part of the mesh is affected by chemicals. In the spherulite structure schematically shown in FIG. 4, since the resin gathers in blocks, the amount of thermoplastic resin which contributes to strength is relatively small. Therefore, it is considered that the strength of the entire layer is easily affected when part of the mesh is affected by chemicals. FIG. 4 is a schematic view showing a spherulite structure as a reference. In FIG. 4, spherulites c are partially positioned densely. An opening d is formed between the spherulites c. FIG. 23 shows an example of a microscope image of a spherulite structure obtained in Reference Example 1 described later.

The surface pore diameter of the layer (A) is 0.6 times to 1.4 times the cross-sectional center pore diameter. The fact that the surface pore diameter of the layer (A) is 0.6 times to 1.4 times the cross-sectional center pore diameter is consistent with the fact that the layer (A) has an isotropic three-dimensional mesh structure. If the surface pore diameter of the layer (A) is 0.6 times the cross-sectional center pore diameter or more, filtration resistance at the surface of the support layer does not increase to a large extent, so that the entire membrane exhibits a high water permeability sufficient for practical use. If the surface pore diameter of the layer (A) is 1.4 times the cross-sectional center pore diameter or less, high mechanical strength can be achieved.

A hollow fiber membrane must exhibit strength that endures a filtration pressure differing from a flat membrane which is generally placed on a support such as a mesh-shaped metal or a plastic. Therefore, a membrane structural design which can provide strength in the filtration direction (i.e., bursting strength and compressive strength) is important. It is possible to achieve low filtration resistance and high compressive strength in combination by suppressing an increase in pore diameter from the vicinity of the center of the cross section to the inner surface of the hollow fiber. Blocking performance, water permeability, and mechanical strength can be achieved in a well-balanced manner by thus controlling the pore diameter of the membrane in the cross-sectional direction. The surface pore diameter of the layer (A) is preferably 0.7 times to 1.3 times, and more preferably 0.8 times to 1.2 times the cross-sectional center pore diameter.

The term "surface pore diameter of the layer (A)" used herein refers to the average pore diameter of the pores observed in the exposed surface of the layer (A) from the outside. The average pore diameter is measured as follows. The exposed surface of the layer (A) of the porous multilayer hollow fiber membrane is photographed using a scanning electron microscope at a magnification at which the shape of a large number of pores can be clearly checked as much as possible. Five lines are drawn on the photograph perpendicularly to each of the horizontal direction and the vertical direction at almost equal intervals, and the length of the line which crosses the pore on the photograph is measured. The arithmetic mean value of the measured values is calculated and taken as the average pore diameter. In order to increase the pore diameter measurement accuracy, it is preferable that the number of pores over which the ten lines drawn in horizontal and vertical directions in total pass be 20 or more. When the pore diameter is about 0.1 to 1 μm, an electron microscope image at a magnification of about 5000 is suitably used.

The term "cross-sectional center pore diameter" used herein refers to a value obtained by photographing the cross section of the porous multilayer hollow fiber membrane when cut perpendicularly to the longitudinal direction within the range of 10% of the total thickness from the center position of the thickness using a scanning electron microscope at an arbitrary magnification, and calculating the arithmetic mean value of the pore diameter using the resulting photograph in the same manner as the average pore diameter. The cross-sectional center pore diameter is preferably 0.1 µm or more and 10 µm or less. Water permeability and mechanical strength can be well-balanced when the cross-sectional center pore diameter is within this range. The cross-sectional center pore diameter is more preferably 0.3 µm or more and 8 µm or less, still more preferably 0.6 µm or more and 6 µm or less, and still more preferably 0.8 µm or more and 4 µm or less.

The porosity of the surface of the layer (B) may be appropriately determined depending on the objective without specific limitations. The porosity of the surface of the layer (B) is preferably 20% or more, more preferably 23% or more, and still more preferably 25% or more from viewpoint of filtration stability of a treatment target liquid containing a suspended substance or the like. The porosity is preferably 80% or less from the viewpoint of increasing the mechanical strength of the surface portion. The porosity is more preferably 60% or less, and still more preferably 50% or less. The porosity may be determined by placing a transparent sheet on a copy of an electron microscope image, painting out the pores using a black pen or the like, copying the transparent sheet onto white paper to clearly distinguish the pores (black) from the non-pore area (white), and calculating the porosity using commercially available image analysis software, as disclosed in WO 01/53213 A1, for example.

The layer (B) is a blocking layer. The blocking layer prevents a foreign matter contained in a treatment target liquid from passing through the membrane due to the small surface pore diameter. The term "surface pore diameter of the layer (B)" used herein refers to the average pore diameter of the pores observed in the exposed surface of the layer (B) from the outside. The surface pore diameter of the layer (B) may be measured using a scanning electron microscope image in the same manner as in the case of measuring the surface pore diameter of the layer (A). The surface pore diameter of the layer (B) is preferably 0.01 µm or more and less than 5 µm. If the surface pore diameter of the layer (B) is 0.01 µm or more, the filtration resistance of the dense surface is low, whereby water permeability sufficient for practical use is easily obtained. If the surface pore diameter of the layer (B) is 5 µm or less, cleaning performance important for the filter membrane can be achieved. The surface pore diameter of the layer (B) is more preferably 0.05 µm or more and 2 µm or more, still more preferably 0.05 µm or more and 0.5 µm or less, and most preferably 0.1 µm or more and 0.5 µm or less.

The surface pore diameter of the layer (B) is less than half of the cross-sectional center pore diameter. This allows the layer (B) to function as a desired blocking layer. The lower limit of the surface pore diameter may be appropriately selected depending on the size of the target to be blocked. It is preferable that the surface pore diameter of the layer (B) be $1/1000$ or more of the cross-sectional center pore diameter from the viewpoint of ensuring water permeability. The surface pore diameter of the layer (B) is more preferably $1/3$ or less and $1/500$ or more, and still more preferably $1/4$ or less and $1/100$ or more of the cross-sectional center pore diameter.

It is preferable that the thickness of the layer (B) be $1/100$ or more and less than $40/100$ of the thickness of the membrane. Even if insoluble matters such as sand and aggregates are contained in a treatment target liquid, the membrane can be used by relatively increasing the thickness of the layer (B) in this manner as described above. Specifically, the surface pore diameter does not change even if the layer (B) is worn to some extent. Desirable blocking performance and high water permeability can be well-balanced when the thickness of the layer (B) is within this range. The thickness of the layer (B) is more preferably $3/100$ or more and $20/100$ or less, and still more preferably $5/100$ or more and $15/100$ or less of the thickness of the membrane.

The layer (B) may have an anisotropic structure in which the diameter of each pore gradually increases from the surface toward the inside of the membrane, differing from the layer (A). Alternatively, the layer (B) may have an isotropic structure in which the diameter of each pore is constant irrespective of the distance from the surface in the same manner as in the layer (A). The layer (B) preferably has an isotropic three-dimensional mesh structure similar to that of the layer (A). This enables the mechanical strength of the entire hollow fiber membrane to be improved while maintaining a desirable blocking performance.

The thicknesses of the layer (A) and the layer (B) are determined as follows. Specifically, the cross-sectional pore diameter of each portion in the thickness direction is determined by a method described in (7) in the examples. A point at which the pore diameter is the closest to a value 0.7 times the cross-sectional center pore diameter from the center of the cross section toward the surface of the layer (B) is determined to lie on a boundary line between the layers. The distance between the boundary line and the surface of the layer (A) is taken as the thickness of the layer (A), and the distance between the boundary line and the surface of the layer (B) is taken as the thickness of the layer (B). When the pore diameter becomes the closest to a value 0.7 times the cross-sectional center pore diameter at a plurality of points, the distance between the surface of the layer (A) and the point closest to the center of the cross section is considered to be the layer (A).

The degree of isotropy of the layer (A) is preferably 80% or more. This means that the layer (A) has an extremely isotropic structure. If the degree of isotropy is 80% or more, high strength can be achieved while maintaining high water permeability. The degree of isotropy of the layer (A) is more preferably 90% or more, and still more preferably 95% or more.

The term "degree of isotropy of the layer (A)" refers to a value (ratio) obtained by dividing the number of portions having a cross-sectional pore diameter 0.8 times to 1.2 times the cross-sectional center pore diameter by the total number of portions included in the layer (A) measured as described above.

The degree of isotropy of the layer (B) is preferably 80% or more. This means that the layer (B) has an extremely isotropic structure. If the degree of isotropy of the layer (B) is 80% or more, the layer (B) exhibits high blocking performance. Moreover, a decrease in blocking performance can be suppressed even when the surface of the layer (B) is worn out due to insoluble matters (e.g., sand or aggregates) contained in a treatment target liquid. The term "degree of isotropy of the layer (B)" refers to a value (ratio) obtained by, provided that the cross-sectional pore diameter at a position half the thickness of the layer (B) is referred to as a cross-sectional center pore diameter (B), dividing the number of portions having a cross-sectional pore diameter 0.8 times to 1.2 times the cross-sectional center pore diameter (B) by the total number of portions included in the layer (B) measured as described above. The degree of isotropy of the layer (B) is more preferably 90% or more, and still more preferably 95% or more. When the thickness of the layer (B) is very small as compared with the total thickness of the membrane, the above measurement is conducted while increasing the number of measurement points of the cross-sectional pore diameter of the layer (B). It is appropriate to measure the cross-sectional pore diameter at 20 points or more.

It is most preferable that the degrees of isotropy of the layer (A) and the layer (B) be 80% or more. If the degrees of isotropy of the both layers are 80% or more, since the membrane structure is efficiently formed by the blocking layer and the strength support layer, a membrane exhibiting blocking performance, water permeability, and strength in a well-balanced manner can be obtained. The degrees of isotropy of the both layers are more preferably 90% or more, and still more preferably 95% or more.

The term "isotropy" used herein may be expressed by a parameter Q described below.

The term "parameter Q" refers to a value which indicates the pore diameter change rate at each position from the outer surface to the inner surface in the thickness direction. The parameter Q is calculated as follows.

The cross-sectional pore diameters at each position in the thickness direction are arranged in order from the outer surface to the inner surface.

The outer surface pore diameter is referred to as $D_0$, the cross-sectional pore diameters are referred to as $D_1$, $D_2$, and $D_n$ in order from the outer surface, and the inner surface pore diameter is referred to as $D_i$.

The parameter Q is given by the following general expression.

$$Q=(D_n-D_{n-1})/D_n$$

The parameter Q for the outer surface pore diameter is calculated as follows.

$$Q=(D_1-D_0)/D_1$$

The parameter Q for the inner surface pore diameter is calculated as follows.

$$Q=(D_i-D_n)/D_i$$

In the porous multilayer hollow fiber membrane according to the present invention, it is preferable that the number of parameters Q which satisfy $-0.2 \leq Q \leq 0.2$ be 80% or more of the total number of parameters Q measured. The number of parameters Q which satisfy $-0.2 \leq Q \leq 0.2$ is more preferably 85% or more, and still more preferably 90% or more of the total number of parameters Q measured. Since most of the membrane has a uniform pore diameter when the number of parameters Q which satisfy $-0.2 \leq Q \leq 0.2$ is within the above range, a membrane exhibiting blocking performance, water permeability, and strength in a well-balanced manner can be obtained.

It is preferable that the number of parameters Q which satisfy $-0.1 \leq Q \leq 0.1$ be 50% or more of the total number of parameters Q measured. The number of parameters Q which satisfy $-0.1 \leq Q \leq 0.1$ is more preferably 60% or more, and still more preferably 70% or more of the total number of parameters Q measured.

A portion for which the parameters Q is smaller than $-0.2$ or larger than 0.2 shows a large change in pore diameter depending on the position in the thickness direction.

The outer surface pore diameter and the inner surface pore diameter are measured by the above-described method. The cross-sectional pore diameter is measured by the measuring method described in (7) in the examples.

The layer (A) or the layer (B) may be positioned on the outer side of the hollow fiber membrane depending on the objective. When using the hollow fiber membrane for service water filtration, it is preferable to dispose the blocking layer on the outer side of the hollow fiber membrane from the viewpoint of long-term stable operation.

The inner diameter of the hollow fiber membrane is preferably 0.4 mm or more and 5 mm or less. If the inner diameter of the hollow fiber membrane is 0.4 mm or more, the pressure loss of a liquid which flows through the hollow fiber membrane does not increase to a large extent. If the inner diameter of the hollow fiber membrane is 5 mm or less, sufficient compressive strength and bursting strength are easily achieved by a hollow fiber membrane having a relatively small thickness. The inner diameter of the hollow fiber membrane is more preferably 0.5 mm or more and 3 mm or less, and still more preferably 0.6 mm or more and 1 mm or less.

The thickness of the hollow fiber membrane is preferably 0.1 mm or more and 1 mm or less. If the thickness of the hollow fiber membrane is 0.1 mm or more, sufficient compressive strength and bursting strength are easily achieved. If the thickness of the hollow fiber membrane is 1 mm or less, sufficient water permeability is easily achieved. The thickness of the hollow fiber membrane is more preferably 0.15 mm or more and 0.8 mm or less, and still more preferably 0.2 mm or more and 0.6 mm or less.

A hollow fiber membrane having such a preferable structure exhibits blocking performance, water permeability, and mechanical strength in a well-balanced manner, and exhibits a high performance under a wide range of operating conditions. Moreover, the hollow fiber membrane does not change relating to the blocking performance (i.e., it exhibits high abrasion resistance) even if insoluble matters such as sand or aggregates are contained in a treatment target liquid.

A membrane having a uniform latex sphere (0.2 μm) blocking rate of 95% or more, a pure water permeability of 5000 l/m$^2$/hr/0.1 MPa or more, and a compressive strength of 0.3 MPa or more is particularly preferable for the objective of the present invention.

EXAMPLES

The present invention is described in detail below by way of examples. Property measurement methods are as follows. The measurement was conducted at 25° C. unless otherwise indicated.

(1) Fiber Diameter (mm) and Aspect Ratio

The hollow fiber membrane was cut to a small thickness using a razor or the like perpendicularly to the longitudinal direction of the membrane. The cross section of the membrane was observed using a microscope. The major axis diameter and the minor axis diameter of the inner diameter and the major axis diameter and the minor axis diameter of the outer diameter of the hollow fiber were measured, and the inner diameter and the outer diameter were determined according to the following expressions.

Inner diameter(mm)=(inner major axis diameter (mm)+inner minor axis diameter(mm))/2

Outer diameter(mm)=(outer major axis diameter (mm)+outer minor axis diameter(mm))/2

The aspect ratio was determined by dividing the major axis of the inner diameter by the minor axis of the inner diameter.

(2) Pure Water Permeation Rate (L/m$^2$/hr/0.1 MPa)

The hollow fiber membrane was immersed in a 50 mass % ethanol aqueous solution for 30 minutes, and then immersed in water for 30 minutes to wet the hollow fiber membrane. One end of the wet hollow fiber membrane having a length of 10 cm was sealed, and a syringe needle was inserted into the other end. Pure water was injected into the hollow portion through the syringe needle at a pressure of 0.1 MPa. The amount of pure water which passed through the membrane was measured. The pure water permeation rate was determined by the following expression.

Pure water permeation rate$(1/m^2/hr)=(60(min/hr) \times$ amount of water permeated$(1))/(\pi \times$inner diameter$(m) \times$effective length$(m) \times$measurement time (min))

The effective membrane length used herein refers to the net membrane length excluding a portion in which the syringe needle is inserted.

(3) Breaking Strength (MPa) and Elongation at Break (%)

Load and displacement upon tension and breakage were measured under the following conditions.

Sample: wet hollow fiber membrane produced by the method (2)

Measuring instrument: Instron tensile tester (AGS-5D manufactured by Shimadzu Corporation), chuck distance: 5 cm Tensile rate: 20 cm/minute The breaking strength and the elongation at break were determined by the following expressions.

Breaking strength$(kgf/cm^2)=$load at break$(kgf)/$cross-sectional area$(cm^2)$

Elongation at break(%)=(displacement at break(cm)/5(cm))×100

The cross-sectional area of the membrane is determined by the following expression.

Cross-sectional area$(cm^2)=\pi \times((outer diameter(cm)/2)^2-((inner diameter(cm)/2)^2)$ (4) Latex Blocking Rate (%)

A monodisperse latex having a particle diameter of 0.208 µm (STADEX manufactured by JSR Corporation, solid content: 1 mass %) was diluted with a 0.5 mass % sodium dodecyl sulfonate (SDS) aqueous solution to prepare a suspension with a latex concentration of 0.01 mass %. 100 ml of the latex suspension was placed in a beaker, and supplied to a wet hollow fiber membrane having an effective length of about 12 cm from the outer surface using a tube pump at a pressure of 0.03 MPa at a linear velocity of 0.1 m/sec so that the liquid which permeated the membrane was let off from the ends (open to the atmosphere) of the hollow fiber membrane to filter the latex suspension. The filtered liquid was returned to the beaker, and filtered with a liquid in a closed system. After 10 minutes of filtration, the liquid which permeated the membrane from the ends of the hollow fiber membrane and the liquid supplied from the beaker were sampled, and measured for an absorbance at 600 nm using an absorbance detector. The latex blocking rate was determined by the following expression.

Latex blocking rate(%)=(1−(absorbance of liquid permeated/absorbance of liquid supplied))×100

(5) Compressive Strength (MPa)

One end of a wet hollow fiber membrane having a length of about 5 cm was sealed with the other end open to the atmosphere. Pure water at 40° C. was caused to permeate the hollow fiber membrane from the outer surface under pressure, and water which permeated the membrane was removed from the open end. In this case, the total amount of water supplied to the membrane was filtered without circulation (i.e., total amount filtration method). The pressure was increased from 0.1 MPa stepwise by 0.01 MPa. The pressure was maintained for 15 seconds, and water removed from the open end within 15 seconds was sampled. When the hollow portion of the hollow fiber membrane is not crushed, the absolute value of the amount (mass) of water which permeates the membrane increases as the pressure increases. When the pressure exceeds the compressive strength of the hollow fiber membrane, the hollow portion of the hollow fiber membrane is crushed so that clogging occurs. As a result, the absolute value of the amount of water which permeates the membrane decreases even if the pressure increases. Therefore, the pressure at which the absolute value of the amount of water which permeated the membrane becomes a maximum was taken as the compressive strength of the hollow fiber membrane.

(6) Inner Surface Pore Diameter, Outer Surface Pore Diameter, and Pore Diameter at the Center of Cross Section (µm)

The inner surface pore diameter, the outer surface pore diameter, and the cross-sectional center pore diameter of the porous hollow fiber membrane were measured using a scanning electron micrograph in which the shape of 20 or more pores could be verified. Five lines were drawn on the photograph (A4) perpendicularly to each of the horizontal direction and the vertical direction at almost equal intervals so that the photograph was divided into six sections in the horizontal direction and the vertical direction. The length of the line crossing the pore on the photograph was measured. The arithmetic mean length was calculated to determine the inner surface pore diameter, the outer surface pore diameter, and the cross-sectional center pore diameter of the porous hollow fiber membrane. When the pore diameter is about 0.1 to 1 µm, an electron microscope image at a magnification of about 5000 is suitably used. The cross-sectional center pore diameter was measured in the range of 10% of the total thickness around the center in the thickness direction.

(7) Cross-Sectional Pore Diameter in Each Portion in the Thickness Direction and Thicknesses of Layer (A) and Layer (B)

The cross section of the hollow fiber membrane was photographed using a scanning electron microscope. A photograph in which the shape of 20 or more pores could be verified was used. One hundred lines of which the distance from the outer surface was equal (i.e., lines connecting points at an equal thickness) were drawn on an A4 photograph so that the total thickness was divided into 101 sections. The length of the line crossing the pore on the photograph was measured. The arithmetic mean length was calculated to determine the cross-sectional pore diameter in each portion in the thickness direction. When the scanning electron micrograph is taken at a sufficiently high magnification, a line whereof the points lie at an equal distance from the outer surface may be approximated by a straight line. A point at which the pore diameter was closest to a value 0.7 times the cross-sectional center pore diameter from the center of the cross section toward the surface of the layer (B) was determined to lie on a boundary line between the layers. The distance between the boundary line and the surface of the layer (A) was taken as the thickness of the layer (A), and the distance between the boundary line and the surface of the layer (B) was taken as the thickness of the layer (B). When the pore diameter is about 0.1 to 1 µm, an electron microscope image at a magnification of about 5000 is suitably used. In the present invention, the total thickness was divided into 14 sections. Specifically, the above measurement was conducted using fourteen electron micrographs (magnification: 5000) of the cross section of the hollow fiber membrane. When the electron micrograph was taken at a sufficiently high magnification, a line whereof the points lie at an equal distance from the outer surface was approximated by a straight line.

(8) Degree of Isotropy (%) of Layer (A)

A value (ratio) obtained by dividing the number of portions having a cross-sectional pore diameter 0.8 times to 1.2 times the cross-sectional center pore diameter in the layer (A) by the total number of portions included in the layer (A) measured in (7) was taken as the degree of isotropy of the layer (A).

(9) Degree of Isotropy (%) of Layer (B)

Lines were drawn concentrically with circles indicated by the cross section of the hollow fiber at intervals at which the thickness of the layer (B) measured in (7) was equally divided into 20 sections. The length of the line crossing the pore on the photograph was measured. The arithmetic mean length was calculated to determine the cross-sectional pore diameter in each portion of the layer (B) in the thickness direction.

The cross-sectional pore diameter at a position half the thickness of the layer (B) is referred to as the cross-sectional center pore diameter (B). A value (ratio) obtained by dividing the number of portions having a cross-sectional pore diameter 0.8 times to 1.2 times the cross-sectional center pore diameter (B) by the total number (20) of portions included in the layer (B) was taken as the degree of isotropy of the layer (B).

(10) Maximum Mass M Absorbed by Inorganic Fine Powder

The oil absorption was measured using an oil absorption measuring device (S410 manufactured by FRONTEX) in accordance with JIS K6217-4. 5 g of the silica fine powder was placed in a sample chamber. The organic liquid was added dropwise to the silica fine powder at 4 ml/min while rotating a rotor blade at 125 rpm. The torque increases as the silica fine powder absorbs the organic liquid. After the torque reaches the maximum value, the torque then decreases. The maximum oil absorption mass M per unit mass of the inorganic fine powder was calculated by the following expression from the total mass of the organic liquid when the torque initially reached 70% of the maximum value.

Maximum mass absorbed by inorganic fine powder per unit mass=total mass of organic liquid when torque reaches 70% of maximum value(g)/5 (g)

(11) Maximum Pore Diameter (μm) (Bubble Point Method)

The maximum pore diameter of the membrane was measured in accordance with ASTM F316-03.

(12) Average Pore Diameter (μm) (Half-Dry Method)

The average pore diameter of the minimum pore diameter layer of the membrane was measured in accordance with ASTM F316-03.

(13) Spinning Stability

A hollow fiber membrane was continuously spun for eight hours. A process in which the molten mixture was extruded and cooled to form a multilayer hollow fiber was observed with the naked eye. A case where the diameter of the hollow fiber did not change and the hollow fiber did not show interface non-uniformity and had roundness was evaluated as "Excellent". A case (a) where interface non-uniformity did not occur, but the hollow fiber had a poor roundness to some extent, or a case (b) where interface non-uniformity did not occur, but the fiber diameter changed to some extent with not impairing production was evaluated as "Good". A case where the hollow fiber showed interface non-uniformity and had a poor roundness was evaluated as "Bad".

Raw materials used in the examples are given below.
<Raw Material>
Thermoplastic Resin
(R-1) Vinylidene fluoride homopolymer (KF#1000 manufactured by Kureha Corporation)
(R-2) High-density polyethylene resin (SH800 manufactured by Asahi Kasei Chemicals Corporation)
Organic Liquid
(L-1) Bis(2-ethylhexyl) phthalate (manufactured by CG Ester Corporation)
(L-2) Dibutyl phthalate (manufactured by CG Ester Corporation)
(L-3) γ-Butyrolactone (special grade, manufactured by Wako Pure Chemical Industries, Ltd.)
Inorganic Fine Powder
(P-1) Silica fine powder (AEROSIL-R972 manufactured by Nippon Aerosil Co., Ltd. Ltd., primary particle diameter: about 16 nm)

The mixing ratio and the production conditions in each example are shown in Table 1.

Example 1

A vinylidene fluoride homopolymer was used as the thermoplastic resin, a mixture of di(2-ethylhexyl) phthalate and dibutyl phthalate was used as the organic liquid, and a silica fine powder was used as the inorganic fine powder. A two-layer hollow fiber membrane was melt-extruded using two extruders utilizing a hollow fiber molding nozzle shown in FIG. 2. An outer-layer molten mixture (a) had a composition in which vinylidene fluoride homopolymer: bis(2-ethylhexyl) phthalate: dibutyl phthalate: silica fine powder=40.0:30.8:6.2:23.0 (mass ratio) (volume ratio: 32.2:44.4:8.4:15). An inner-layer molten mixture (b) had a composition in which vinylidene fluoride homopolymer:bis(2-ethylhexyl) phthalate: dibutyl phthalate: silica fine powder=40.0:35.1:1.9:23.0 (mass ratio) (volume ratio: 32.0:50.0:2.6:14.9). Air was used as a hollow-portion-forming fluid. The molten mixture was extruded from a hollow fiber molding nozzle (outer diameter: 2.00 mm, inner diameter: 0.92 mm) at a resin temperature of 240° C. and a discharge linear velocity of 14.2 m/min (i.e., spinning nozzle discharge parameter R was 440/sec) so that the thickness ratio (outer layer:inner layer) was 10:90. The outer diameter of the nozzle refers to the outermost diameter of the discharge port in FIG. 2. The inner diameter of the nozzle refers to the maximum diameter of the lower end of the partition wall between the inner-layer molten mixture discharge port and the hollow-portion-forming fluid discharge port.

The extruded hollow fiber extruded product traveled over 60 cm in the air, and was introduced into a water bath at 40° C. to solidify the product. The product was wound around a reel at 40 m/min. The resulting two-layer hollow fiber was immersed in methylene chloride to remove bis(2-ethylhexyl) phthalate and dibutyl phthalate by extraction, and was then dried. The dried product was immersed in a 50 mass % ethanol aqueous solution for 30 minutes, immersed in water for 30 minutes, immersed in a 20 mass % sodium hydroxide aqueous solution at 70° C. for one hour, and then washed with water to remove the silica fine powder by extraction.

The resulting porous two-layer hollow fiber membrane did not show interface non-uniformity and had a high roundness. As a result of cross-sectional observation using an electron microscope, it was confirmed that the blocking layer and the support layer had an isotropic three-dimensional mesh structure without macro-voids. Table 2 shows the outer diameter, the inner diameter, the aspect ratio, the pure water permeation rate, the uniform latex sphere blocking rate, the breaking strength, the elongation at break, the compressive strength, the outer surface pore diameter (corresponding to the surface pore diameter of the layer (B)), the inner surface pore diameter (corresponding to the surface pore diameter of the layer (A)), the cross-sectional center pore diameter, the ratio of the outer surface pore diameter and the cross-sectional center pore diameter, the ratio of the inner surface pore diameter and the cross-sectional center pore diameter, and the degrees of isotropy of the layer (A) and the layer (B) of the resulting membrane. The porous two-layer hollow fiber membrane had a high pure water permeation rate, latex blocking rate, and mechanical strength.

The porous two-layer hollow fiber membrane was wetted by the method (2), and immersed in a 4 mass % sodium hydroxide aqueous solution containing sodium hypochlorite (free chlorine concentration: 0.5 mass %) at room temperature for 10 days. The elongation at break of the porous two-layer hollow fiber membrane was measured before and after immersion. The elongation at break after immersion was 90% of the elongation at break before immersion. It was confirmed that the porous two-layer hollow fiber membrane had excellent chemical resistance.

Figure 6:
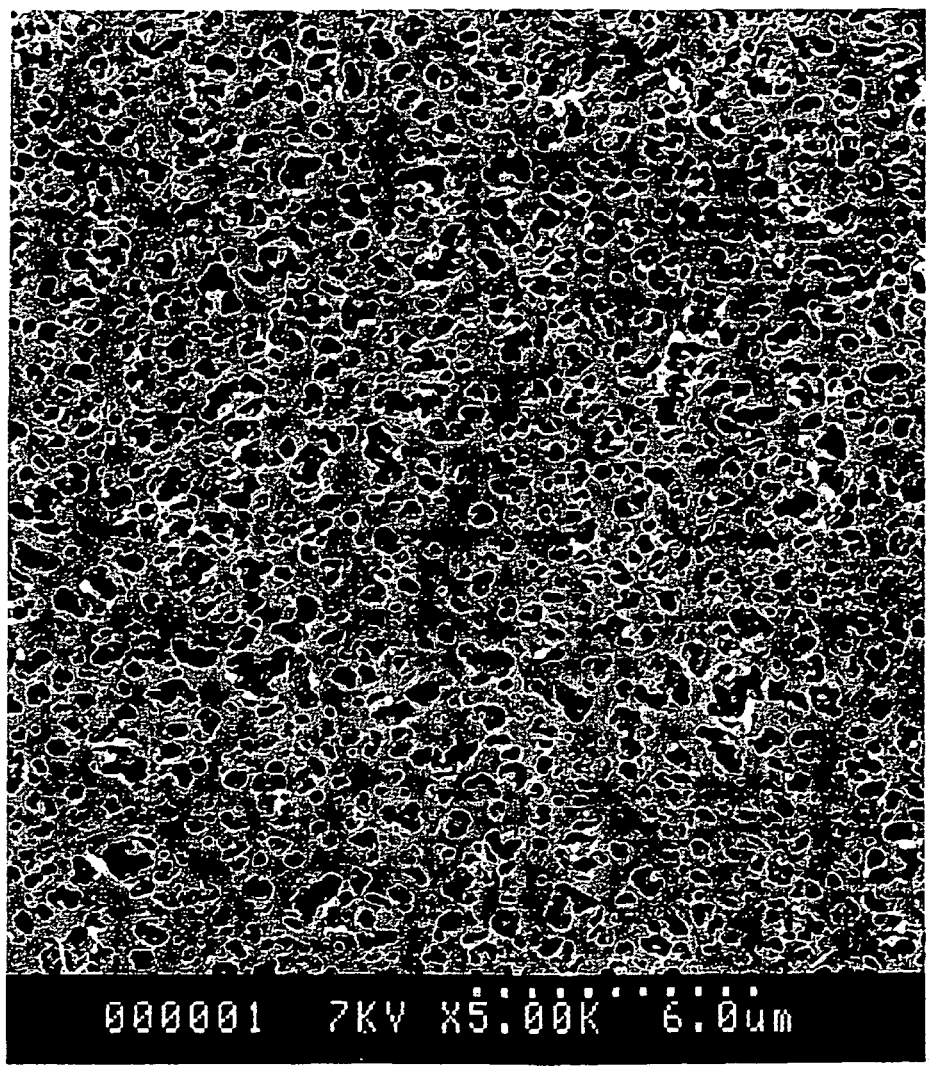
FIG. 6 shows an electron micrograph (magnification: 5000) of the outer surface of a porous two-layer hollow fiber membrane obtained in Example 1.
Figure 7:
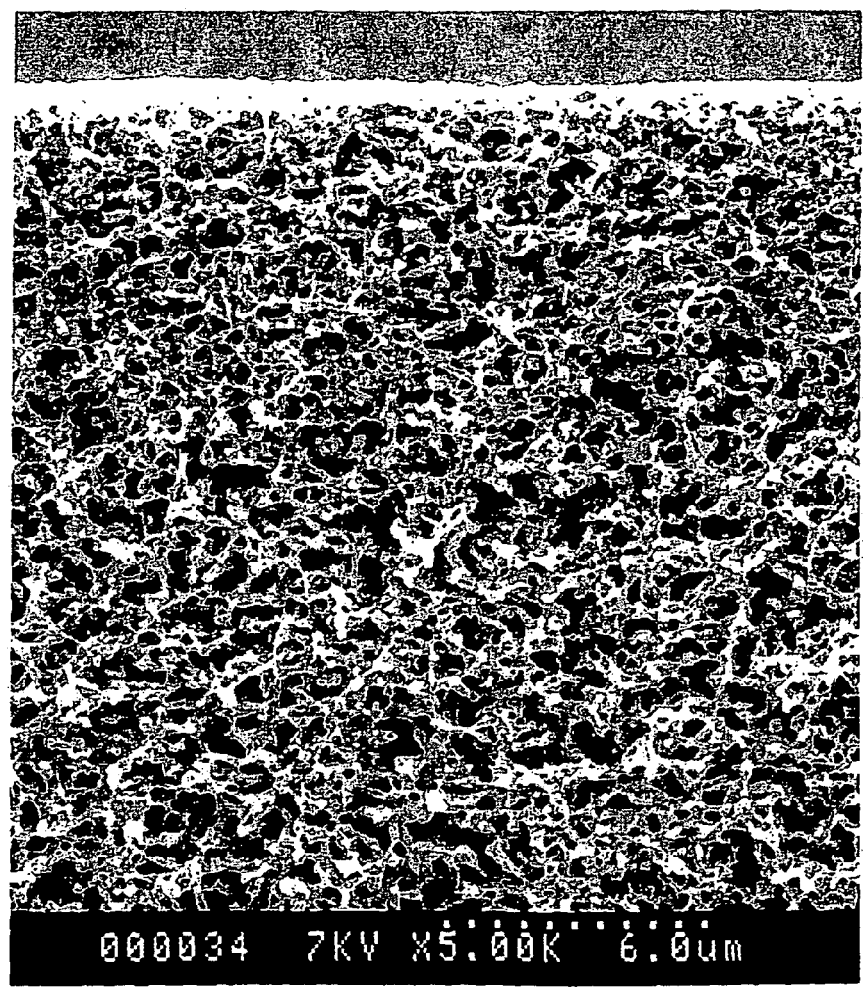
FIG. 7 shows an electron micrograph (magnification: 5000) of a cross section around the outer surface of a porous two-layer hollow fiber membrane obtained in Example 1.
Figure 8:
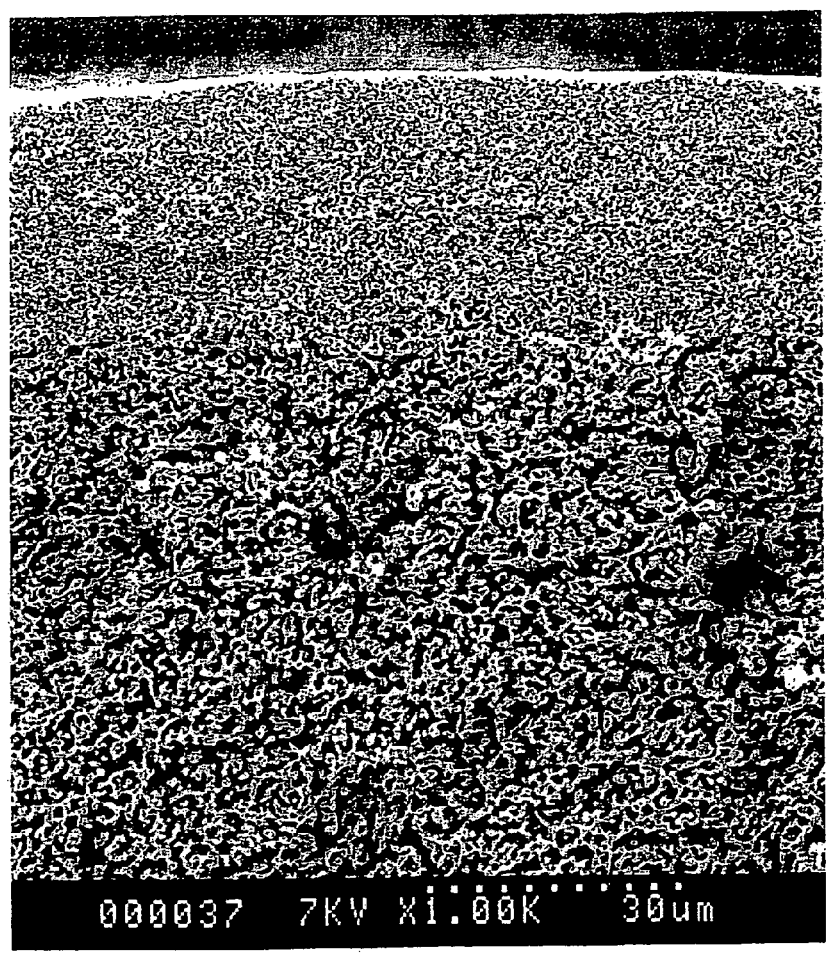
FIG. 8 shows an electron micrograph (magnification: 1000) of a cross section around the outer surface of a porous two-layer hollow fiber membrane obtained in Example 1.
Figure 10:
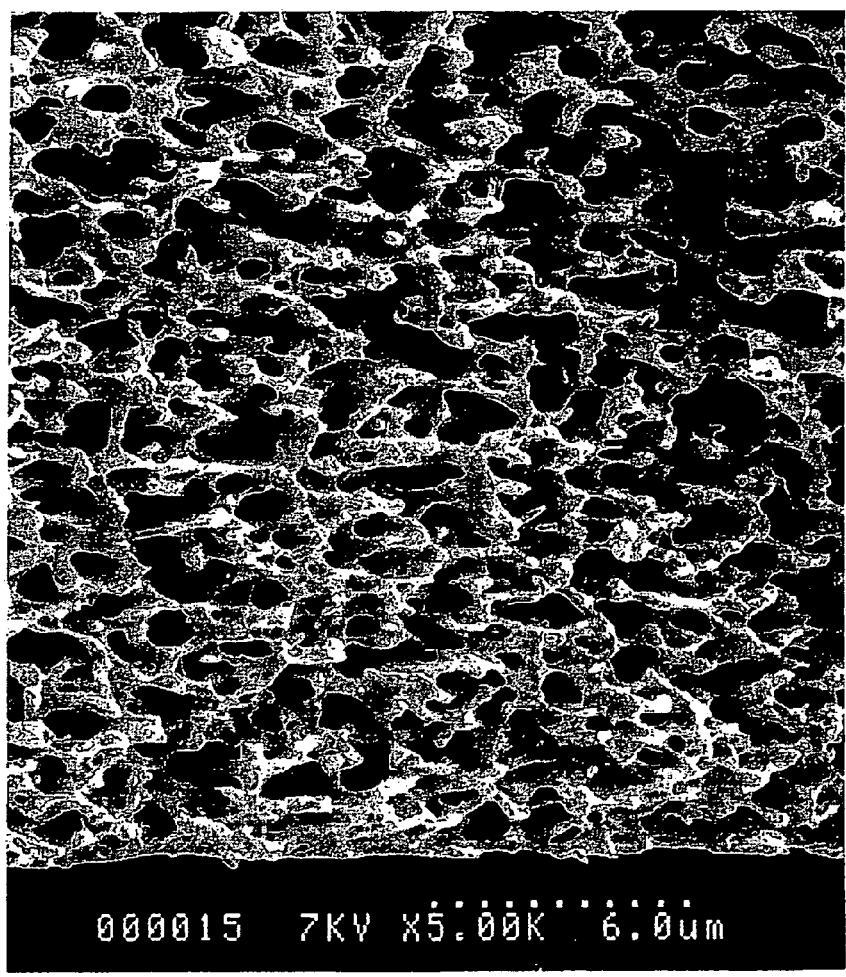
FIG. 10 shows an electron micrograph (magnification: 5000) of a cross section around the inner surface of a porous two-layer hollow fiber membrane obtained in Example 1.
Figure 11:
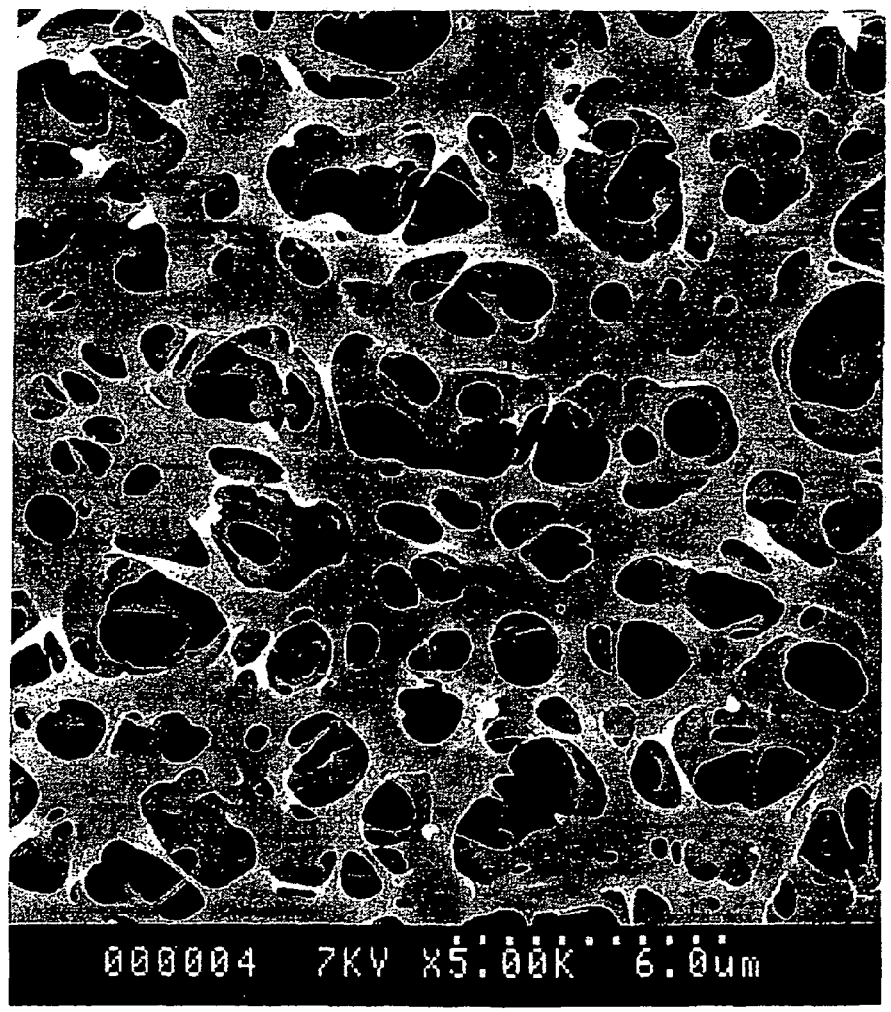
FIG. 11 shows an electron micrograph (magnification: 5000) of the inner surface of a porous two-layer hollow fiber membrane obtained in Example 1.

FIG. 6 shows an electron microscope image of the outer surface of the porous two-layer hollow fiber membrane at a magnification of 5000. FIG. 7 shows an electron microscope image of a portion around the outer surface of the cross section at a magnification of 5000. FIG. 8 shows an electron microscope image of a portion around the outer surface of the cross section at a magnification of 1000. FIG. 9 shows an electron microscope image of the center of the cross section at a magnification of 5000. FIG. 10 shows an electron microscope image of a portion around the inner surface of the cross section at a magnification of 5000. FIG. 11 shows an electron microscope image of the inner surface at a magnification of 5000. As is clear from the electron microscope images shown in FIGS. 6 to 11, the outer layer having a small pore diameter and the inner layer having a large pore diameter were formed in the porous two-layer hollow fiber membrane. The surface porosity of the layer (B) was 25%.

Figure 12:
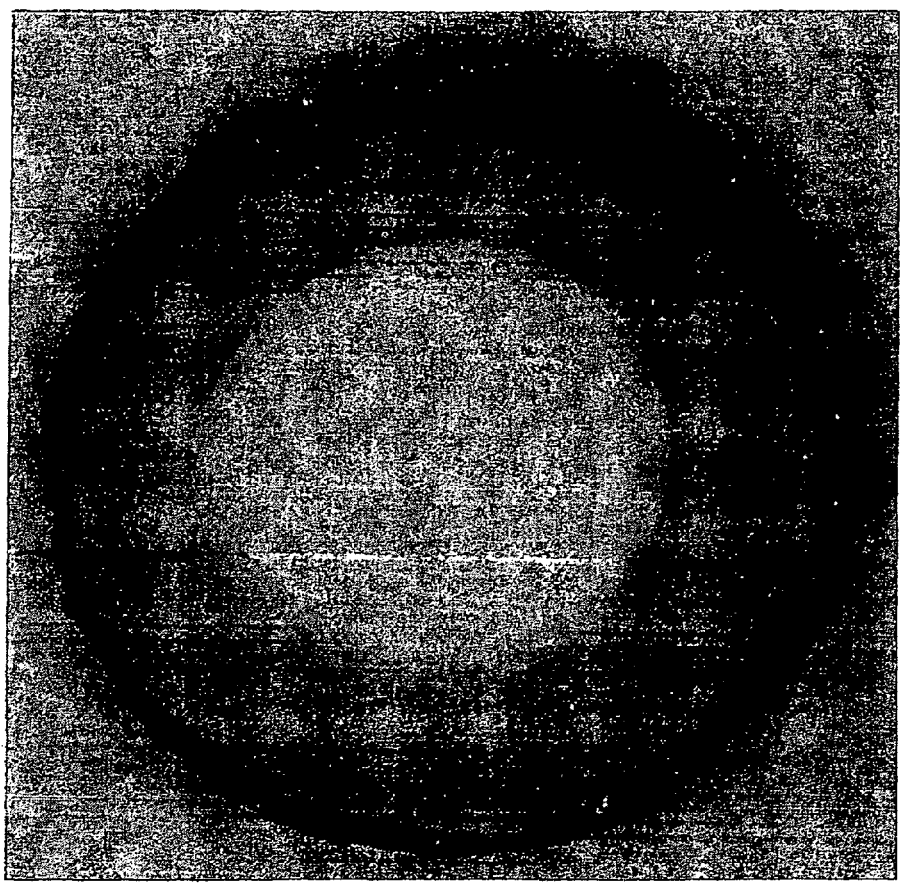
FIG. 12 shows a microscope image of the circular cross section of a hollow fiber extruded product obtained by mixing graphite into a molten mixture (a) (outer layer).

A small amount of graphite was mixed into the molten mixture (a) (outer layer) to obtain a two-layer hollow fiber (organic liquid was not removed). The entire outer surface of the two-layer hollow fiber was black. This indicates that the entire outer surface was covered with the molten mixture (a). A white area which indicates that the molten mixture (b) was exposed on the outer surface was not observed on the two-layer hollow fiber over 100 meters or more. FIG. 12 shows a microscope image of the circular cross section of the two-layer hollow fiber. As shown in FIG. 12, the black layer (layer of the molten mixture (a)) covered the outer surface in the cross-sectional direction to a uniform thickness without defects.

Example 2

A porous two-layer hollow fiber membrane was obtained in the same manner as in Example 1 except for using an outer-layer molten mixture (a) having a composition in which vinylidene fluoride homopolymer: bis(2-ethylhexyl) phthalate: dibutyl phthalate: silica fine powder=34:33.8:6.8:25.4 (mass ratio) and an inner-layer molten mixture (b) having a composition in which vinylidene fluoride homopolymer:bis(2-ethylhexyl) phthalate:dibutyl phthalate:silica fine powder=36:35.3:5.0:23.7 (mass ratio).

Figure 13:
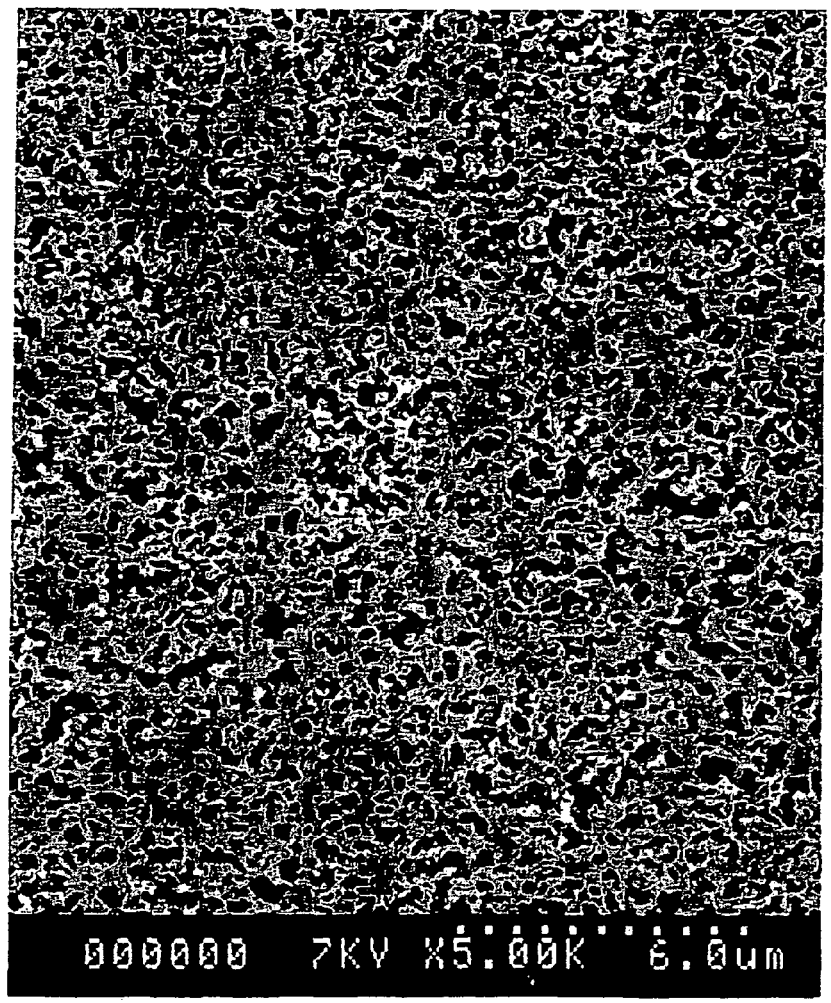
FIG. 13 shows an electron micrograph (magnification: 5000) of the outer surface of a porous two-layer hollow fiber membrane obtained in Example 1.
Figure 14:
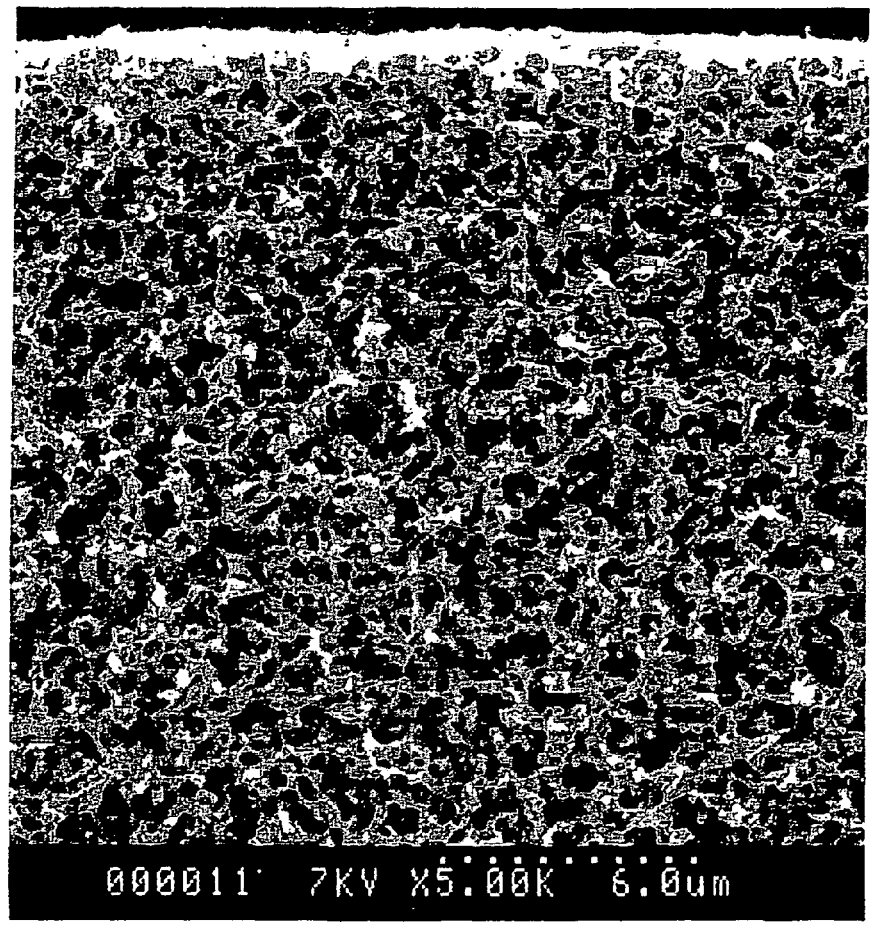
FIG. 14 shows an electron micrograph (magnification: 5000) of a cross section around the outer surface of a porous two-layer hollow fiber membrane obtained in Example 1.
Figure 15:
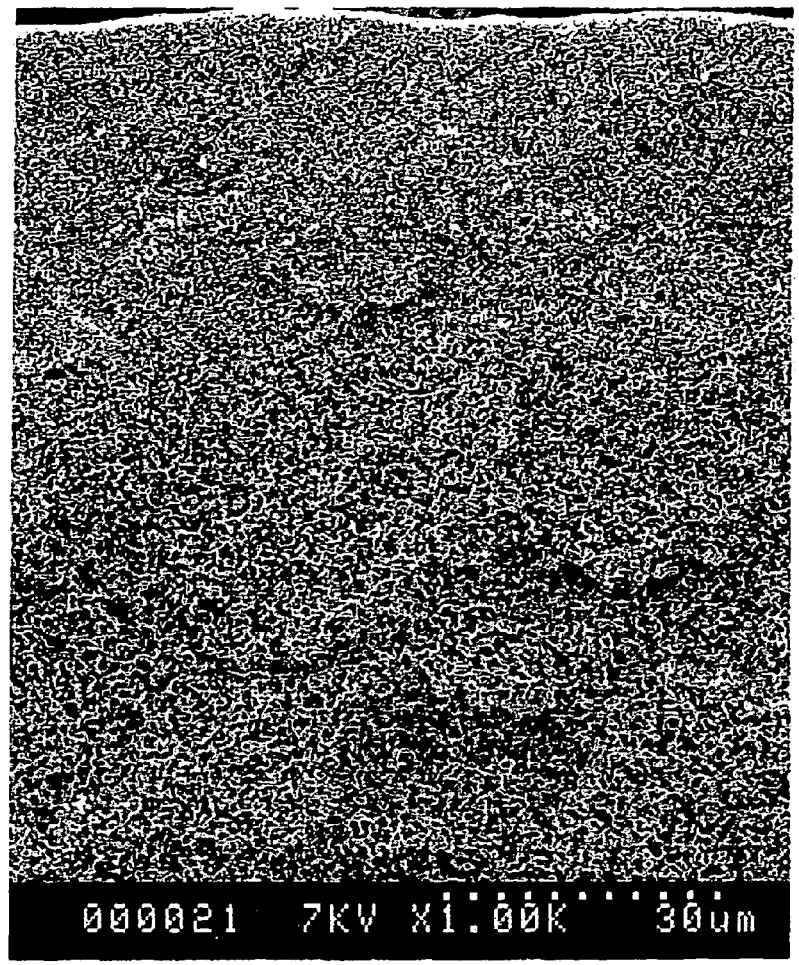
FIG. 15 shows an electron micrograph (magnification: 1000) of a cross section around the outer surface of a porous two-layer hollow fiber membrane obtained in Example 2.
Figure 16:
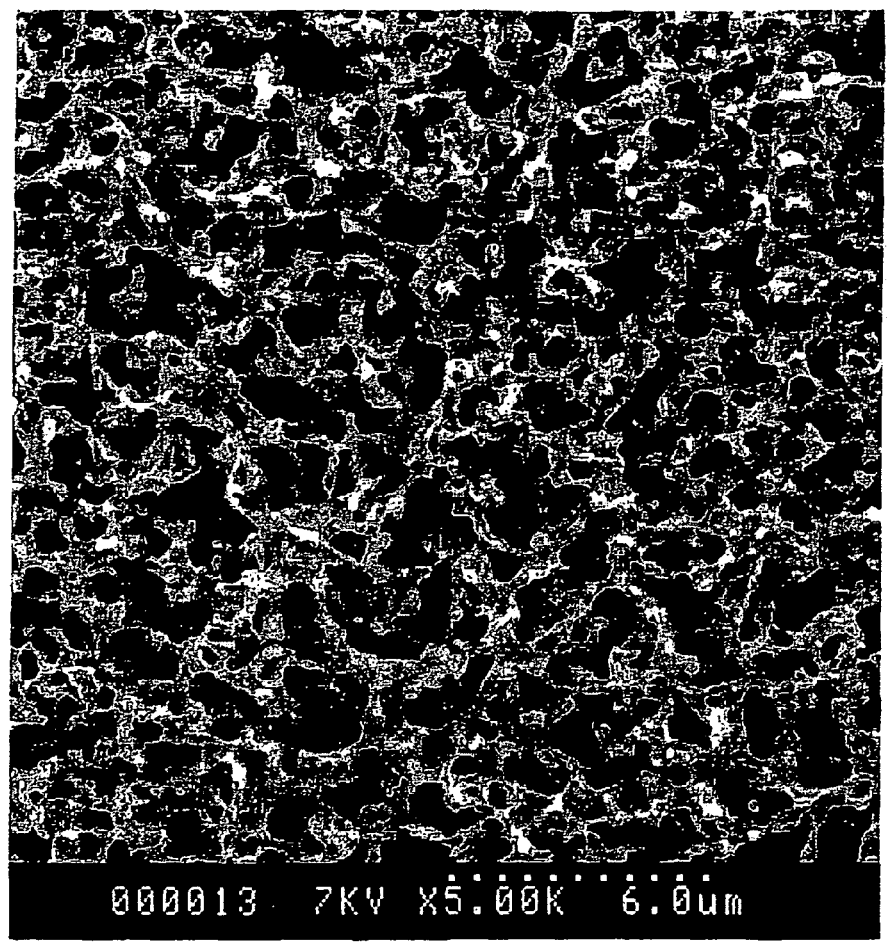
FIG. 16 shows an electron micrograph (magnification: 5000) of the center of a cross section of a porous two-layer hollow fiber membrane obtained in Example 2.
Figure 17:
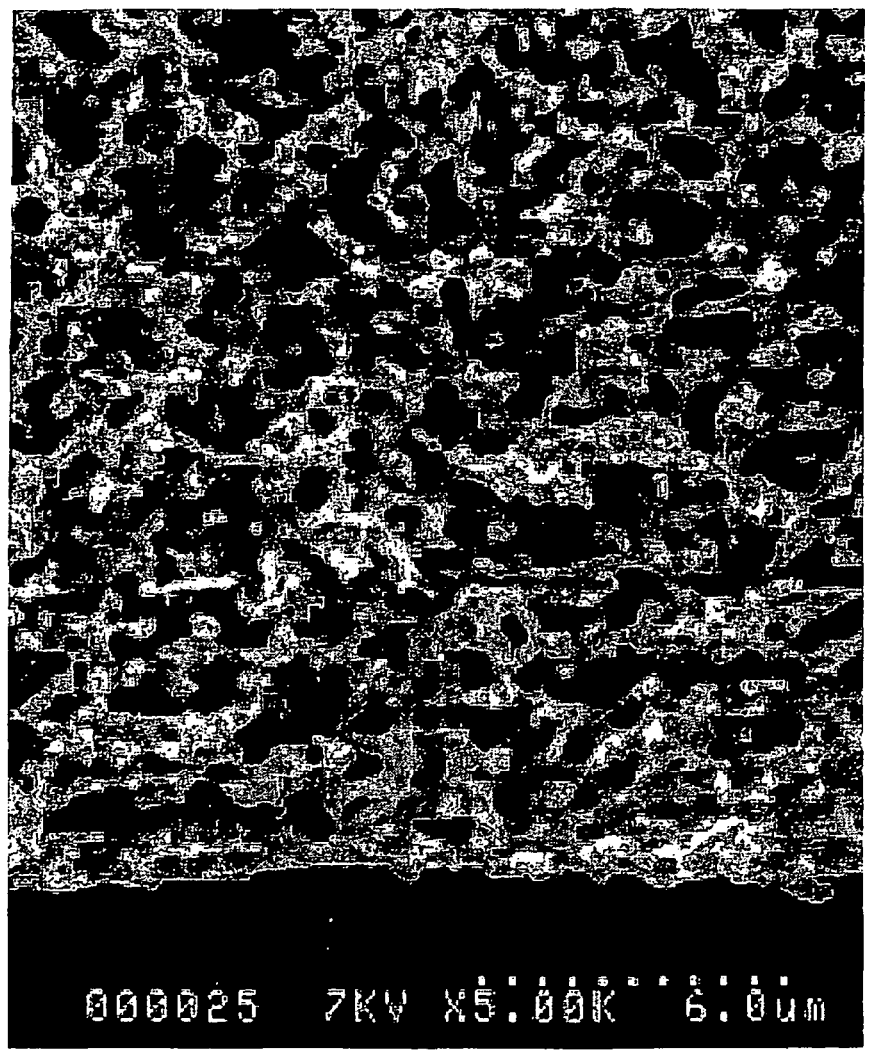
FIG. 17 shows an electron micrograph (magnification: 5000) of a cross section around the inner surface of a porous two-layer hollow fiber membrane obtained in Example 2.
Figure 18:
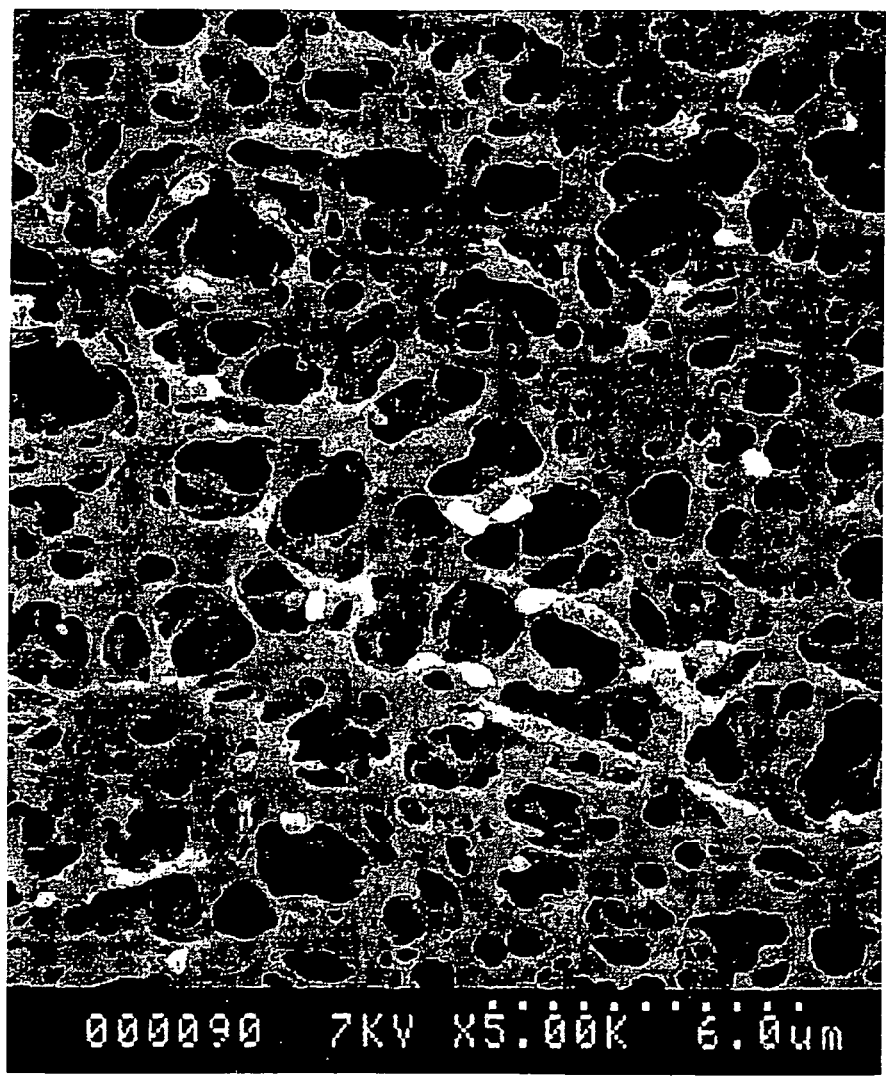
FIG. 18 shows an electron micrograph (magnification: 5000) of the inner surface of a porous two-layer hollow fiber membrane obtained in Example 2.
Figure 19:
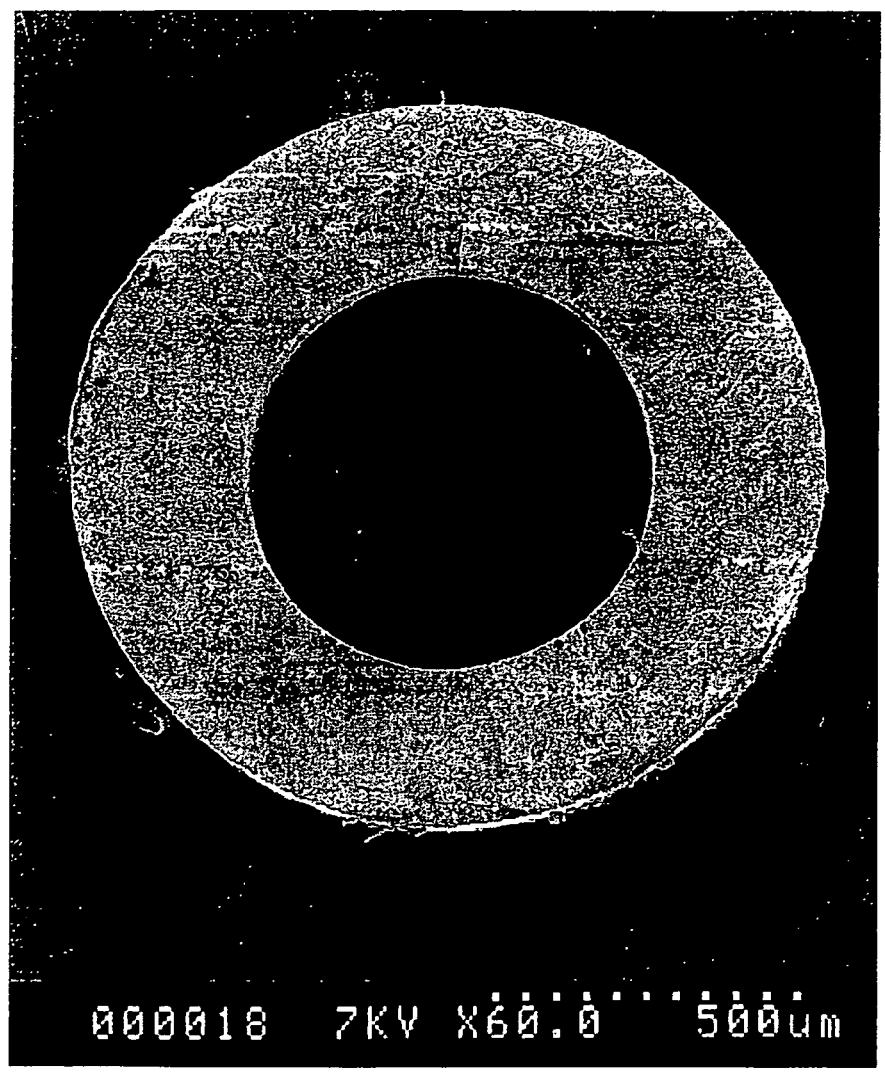
FIG. 19 shows an electron micrograph (magnification: 60) of the entire circular cross section of a porous two-layer hollow fiber membrane obtained in Example 2.
Figure 20:
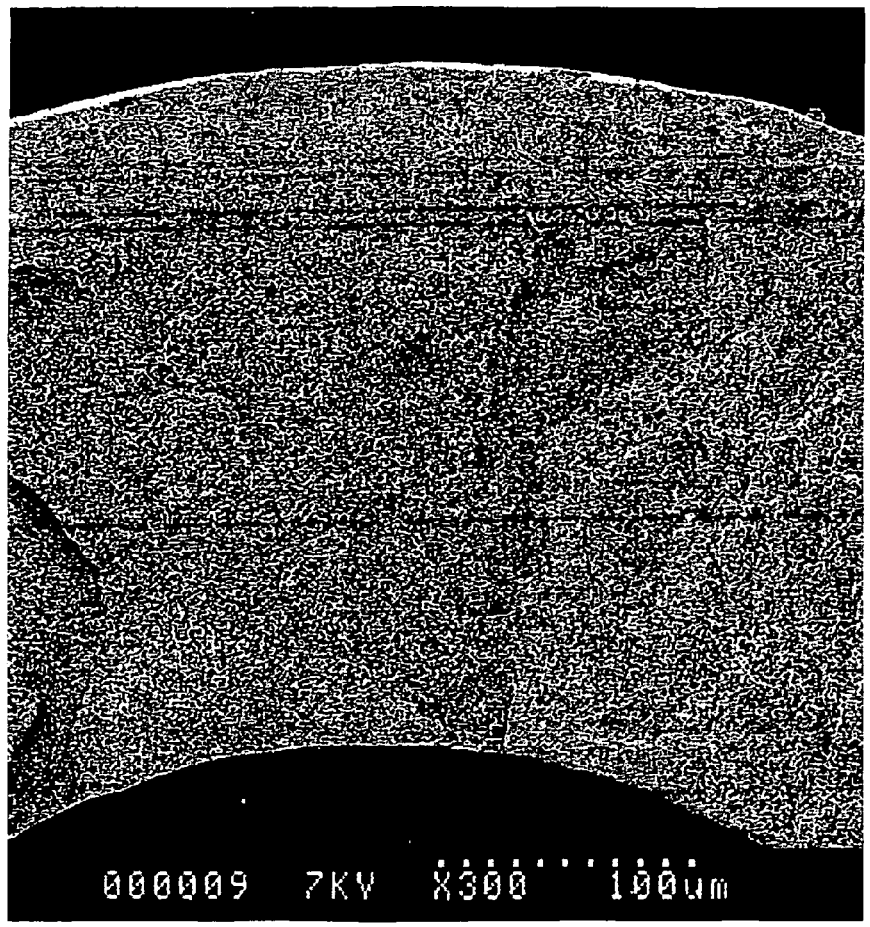
FIG. 20 shows an electron micrograph (magnification: 300) of the circular cross section of a porous two-layer hollow fiber membrane obtained in Example 2.

FIG. 13 shows an electron microscope image of the outer surface of the porous two-layer hollow fiber membrane at a magnification of 5000. FIG. 14 shows an electron microscope image of a portion around the outer surface of the cross section at a magnification of 5000. FIG. 15 shows an electron microscope image of a portion around the outer surface of the cross section at a magnification of 1000. FIG. 16 shows an electron microscope image of the center of the cross section at a magnification of 5000. FIG. 17 shows an electron microscope image of a portion around the inner surface of the cross section at a magnification of 5000. FIG. 18 shows an electron microscope image of the inner surface at a magnification of 5000. FIG. 19 shows an electron microscope image of the cross section at a magnification of 60. FIG. 20 shows an electron microscope image of the cross section at a magnification of 300. As is clear from the electron microscope images shown in FIGS. 13 to 20, the outer layer having a small pore diameter and the inner layer having a large pore diameter were formed in the porous two-layer hollow fiber membrane. The surface porosity of the layer (B) was 30%.

Figure 21:
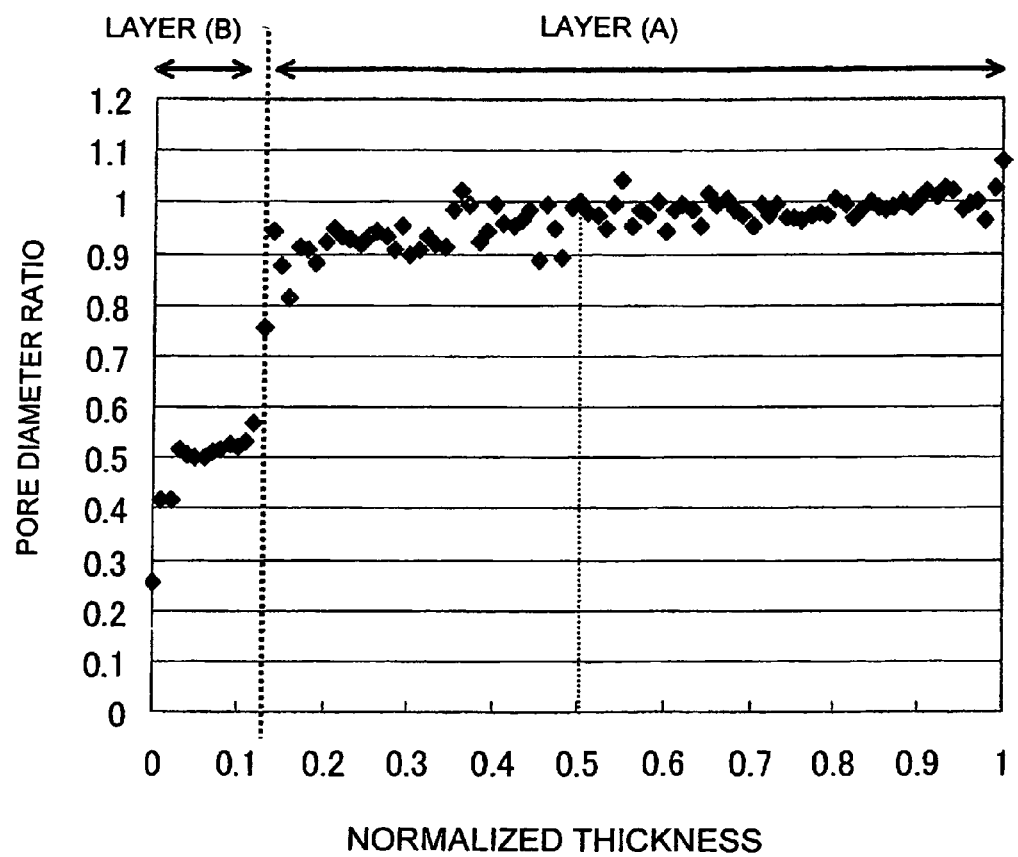
FIG. 21 is a graph showing a change in cross-sectional pore diameter of a porous two-layer hollow fiber membrane obtained in Example 2.
Figure 33:
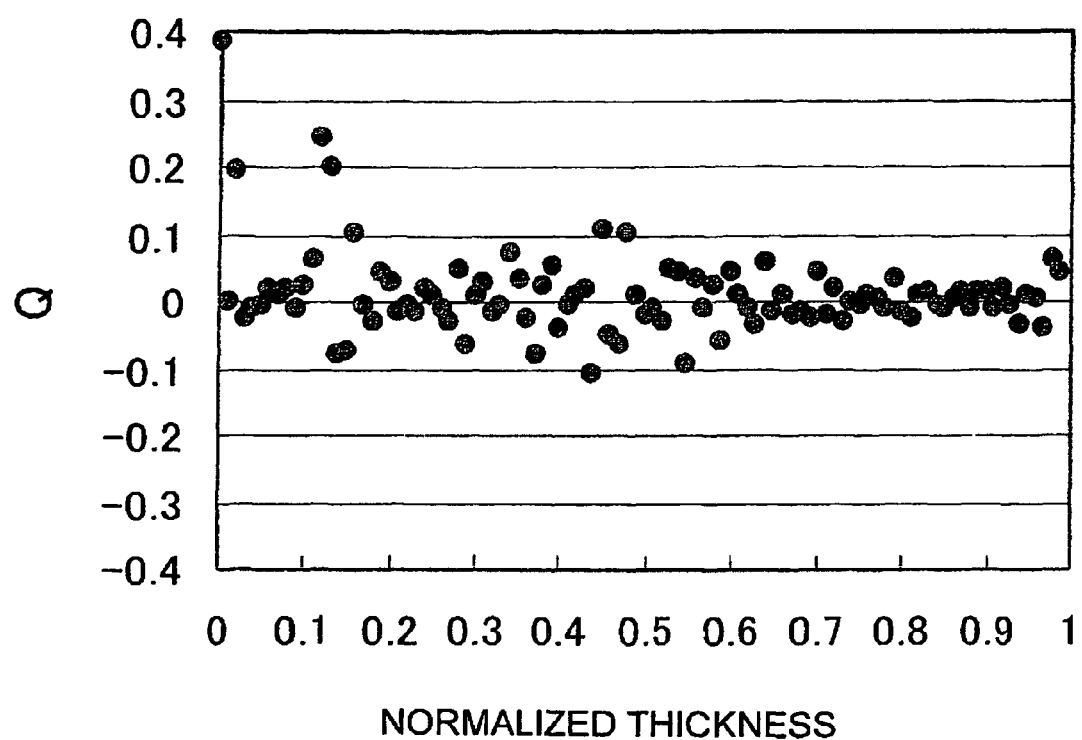
FIG. 33 shows a change in parameter Q of a porous two-layer hollow fiber membrane obtained in Example 2 depending on the thickness position. The horizontal axis a position in the thickness direction when the total thickness is one, and the vertical axis indicates the parameter Q.

The resulting porous two-layer hollow fiber membrane did not show interface non-uniformity and had a high roundness. As a result of cross-sectional observation using an electron microscope, it was confirmed that the blocking layer and the support layer had an isotropic three-dimensional mesh structure without macro-voids. The property evaluation results of the resulting membrane are shown in Table 2. The porous two-layer hollow fiber membrane had a high pure water permeation rate, latex blocking rate, and mechanical strength. FIG. 21 shows the measurement results for the cross-sectional pore diameter when equally dividing the cross section of the porous two-layer hollow fiber membrane into 100 sections. The porous two-layer hollow fiber membrane had a structure very similar to that shown in FIG. 5(3). FIG. 33 shows the measurement results for the parameter Q.

Example 3

A porous two-layer hollow fiber membrane was obtained in the same manner as in Example 1 except for using an outer-layer molten mixture (a) having a composition in which vinylidene fluoride homopolymer:(2-ethylhexyl) phthalate: dibutyl phthalate=40.0:36.0:24.0 (mass ratio).

The resulting porous two-layer hollow fiber membrane did not show interface non-uniformity and had a high roundness. As a result of cross-sectional observation using an electron microscope, it was confirmed that the blocking layer and the support layer had an isotropic three-dimensional mesh structure without macro-voids. The property evaluation results of the resulting membrane are shown in Table 2. The porous two-layer hollow fiber membrane had a high pure water permeation rate, latex blocking rate, and mechanical strength.

Example 4

A porous two-layer hollow fiber membrane was obtained in the same manner as in Example 1 except that the compositions of inner-layer and outer-layer are exchanged, thus, an inner-layer molten mixture having a composition in which vinylidene fluoride homopolymer:bis(2-ethylhexyl) phthalate:dibutyl phthalate:silica fine powder=40.0:30.8:6.2:23.0 (mass ratio) and an outer-layer molten mixture having a composition in which vinylidene fluoride homopolymer: bis(2-ethylhexyl) phthalate: dibutyl phthalate: silica fine powder=40.0:35.1:1.9:23.0 (mass ratio) were extruded so that the thickness ratio (outer layer:inner layer) was 90:10. As a result of cross-sectional observation of the resulting porous two-layer hollow fiber membrane using an electron microscope, it was confirmed that the blocking layer and the support layer had an isotropic three-dimensional mesh structure without macro-voids. The property evaluation results of the resulting membrane are shown in Table 2. The porous two-layer hollow fiber membrane had a high pure water permeation rate, latex blocking rate, and mechanical strength in the same manner as in Example 1.

Example 5

A porous two-layer hollow fiber membrane was obtained in the same manner as in Example 1 except for using an outer-layer molten mixture (a) having a composition in which high-density polyethylene resin (thermoplastic resin):bis(2-ethylhexyl) phthalate (organic liquid):silica fine powder (inorganic fine powder)=20.0:56.0:24.0 (mass ratio) (volume ratio: 23.5:64.2:12.3). As a result of cross-sectional observation of the resulting porous two-layer hollow fiber membrane using an electron microscope, it was confirmed that the blocking layer and the support layer had an isotropic three-dimensional mesh structure without macro-voids. The property evaluation results of the resulting membrane are shown in Table 2.

The porous two-layer hollow fiber membrane was wetted by the method (2), and immersed in a 4 mass % sodium hydroxide aqueous solution containing sodium hypochlorite (free chlorine concentration: 0.5 mass %) at room temperature for 10 days. The elongation at break of the porous two-layer hollow fiber membrane was measured before and after immersion. The elongation at break after immersion was 60% of the elongation at break before immersion. It was confirmed that the porous two-layer hollow fiber membrane had excellent chemical resistance.

Example 6

The ends of the porous two-layer hollow fiber membrane (effective length: 10 cm) from which the organic liquid and the inorganic fine powder were removed by extraction obtained in Example 2 were held with both hands and stretched to a fiber length of 20 cm, and the hands were then removed. The fiber length decreased to 13 cm. The property evaluation results of the resulting membrane are shown in Table 2.

Example 7

A porous two-layer hollow fiber membrane was obtained in the same manner as in Example 1 except for setting the resin temperatures of the outer-layer molten mixture (a) at 270° C. and the inner-layer molten mixture (b) during merging at 250° C. The property evaluation results of the resulting membrane are shown in Table 2.

Example 8

A porous two-layer hollow fiber membrane was obtained in the same manner as in Example 1 except for using an inner-layer molten mixture (b) having a composition in which vinylidene fluoride homopolymer:bis(2-ethylhexyl) phthalate:dibutyl phthalate:silica fine powder=40:19.1:1.0:39.9 (mass ratio). The property evaluation results of the resulting membrane are shown in Table 2.

Example 9

A porous two-layer hollow fiber membrane was obtained in the same manner as in Example 1 except for using an inner-layer molten mixture (b) having a composition in which vinylidene fluoride homopolymer:bis(2-ethylhexyl) phthalate:dibutyl phthalate:silica fine powder=40:49.9:2.6:7.5 (mass ratio). The resulting hollow fiber membrane was flat to some extent and did not maintain roundness within a practical range. The property evaluation results of the resulting membrane are shown in Table 2.

Example 10

A porous two-layer hollow fiber membrane was obtained in the same manner as in Example 1 except that the molten mixture was extruded from a hollow fiber molding nozzle (outer diameter: 1.75 mm, inner diameter: 0.92 mm) at a discharge linear velocity of 20.2 m/min (i.e., spinning nozzle discharge parameter R was 814/sec). The property evaluation results of the resulting membrane are shown in Table 2.

Example 11

A porous two-layer hollow fiber membrane was obtained in the same manner as in Example 1 except that the molten mixture was extruded from a hollow fiber molding nozzle (outer diameter: 1.75 mm, inner diameter: 0.92 mm) at a discharge linear velocity of 10.1 m/min (i.e., spinning nozzle discharge parameter R was 407/sec), the extruded hollow fiber extruded product traveled over 30 cm in the air and was introduced into a water bath at 40° C. to solidify the product, and the product was wound around a reel at 20 m/min. The property evaluation results of the resulting membrane are shown in Table 2.

Example 12

A porous two-layer hollow fiber membrane was obtained in the same manner as in Example 1 except that the molten mixture was extruded from a hollow fiber molding nozzle (outer diameter: 1.75 mm, inner diameter: 0.92 mm) at a discharge linear velocity of 0.20 m/min (i.e., spinning nozzle discharge parameter R was 8/sec), the extruded hollow fiber extruded product traveled over 0.6 cm in the air and was introduced into a water bath at 40° C. to solidify the product, and the product was wound around a reel at 0.4 m/min. A change in fiber diameter was observed during travel in the air, but was within a practical range. The property evaluation results of the resulting membrane are shown in Table 2.

Example 13

A porous two-layer hollow fiber membrane was obtained in the same manner as in Example 1 except that the molten mixture was extruded from a hollow fiber molding nozzle (outer diameter: 1.75 mm, inner diameter: 0.92 mm) at a discharge linear velocity of 25.3 m/min (i.e., spinning nozzle discharge parameter R was 1017/sec), the extruded hollow fiber extruded product traveled over 75 cm in the air and was introduced into a water bath at 40° C. to solidify the product, and the product was wound around a reel at 50 m/min. The property evaluation results of the resulting membrane are shown in Table 2.

Example 14

A porous two-layer hollow fiber membrane was obtained in the same manner as in Example 1 except that the molten mixtures were extruded so that the thickness ratio (outer layer:inner layer) was 5:95, the extruded hollow fiber extruded product traveled over 30 cm in the air and was introduced into a water bath at 40° C. to solidify the product, and the product was wound around a reel at 20 m/min. The property evaluation results of the resulting membrane are shown in Table 2.

Comparative Example 1

A porous two-layer hollow fiber membrane was obtained in the same manner as in Example 3 except for using an inner-layer molten mixture (b) having a composition in which vinylidene fluoride homopolymer:bis(2-ethylhexyl) phthalate:dibutyl phthalate=40.0:42.0:18.0 (mass ratio). The resulting porous two-layer hollow fiber membrane did not become stably round (i.e., the membrane became oval or surface waving occurred), differing from the porous two-layer hollow fiber membranes obtained in the examples. The property evaluation results of the resulting membrane are shown in Table 2.

The porous two-layer hollow fiber membrane was wetted by the method (2), and immersed in a 4 mass % sodium hydroxide aqueous solution containing sodium hypochlorite (free chlorine concentration: 0.5 mass %) at room temperature for 10 days. The elongation at break of the porous two-layer hollow fiber membrane was measured before and after immersion. The elongation at break after immersion decreased to 20% of the elongation at break before immersion.

A small amount of graphite was mixed into the molten mixture (a) (outer layer) to obtain a two-layer hollow fiber (organic liquid was not removed) in the same manner as in Example 1. The outer surface of the two-layer hollow fiber was not entirely black (i.e., a number of white streaks and spots were observed). This indicates that the outer surface was not entirely covered with the molten mixture (a) so that the molten mixture (b) (inner layer) was exposed on the outer surface at a number of points. As a result of cross-sectional observation of the hollow fiber, the black layer (layer of the molten mixture (a)) did not thinly covered the outer surface to a uniform thickness without defects (see FIG. 12). The interface between the layer of the molten mixture (a) (black layer; outer layer) and the layer of the molten mixture (b) (white layer; inner layer) was wavy. This indicates that the outer layer partially broke so that the inner layer was exposed on the outer surface.

Comparative Example 2

A porous hollow fiber membrane was obtained in the same manner as in Example 1 having the same thickness as that of Example 1 except that the outer-layer molten mixture (a) was not extruded, and only an inner-layer molten mixture (b) having a composition in which vinylidene fluoride homopolymer:bis(2-ethylhexyl) phthalate:dibutyl phthalate:silica fine powder=40.0:30.8:6.2:23.0 (mass ratio) was extruded from the inner-layer slit. As a result of cross-sectional observation using an electron microscope, it was confirmed that the resulting porous hollow fiber membrane had an isotropic three-dimensional mesh structure without macro-voids. The property evaluation results of the resulting membrane are shown in Table 2. The porous hollow fiber membrane had a high latex blocking rate and high mechanical strength, but showed a significantly low pure water permeation rate.

Figure 22:
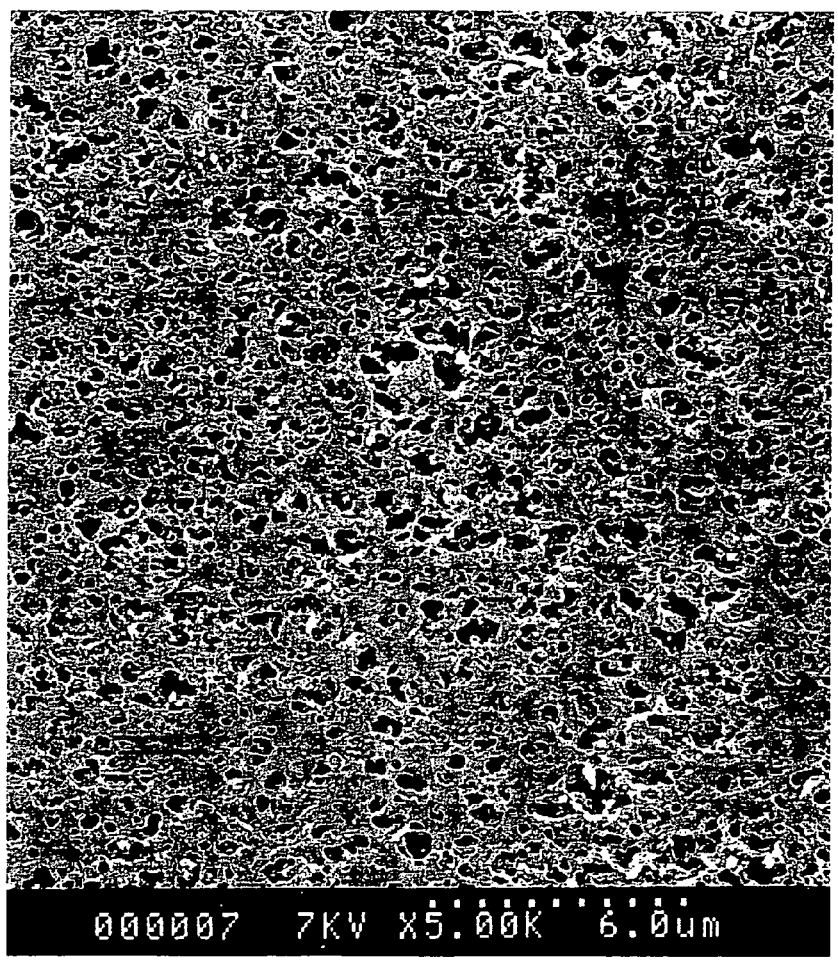
FIG. 22 shows an electron micrograph (magnification: 5000) of the outer surface of a porous two-layer hollow fiber membrane obtained in Comparative Example 2.
Figure 24:
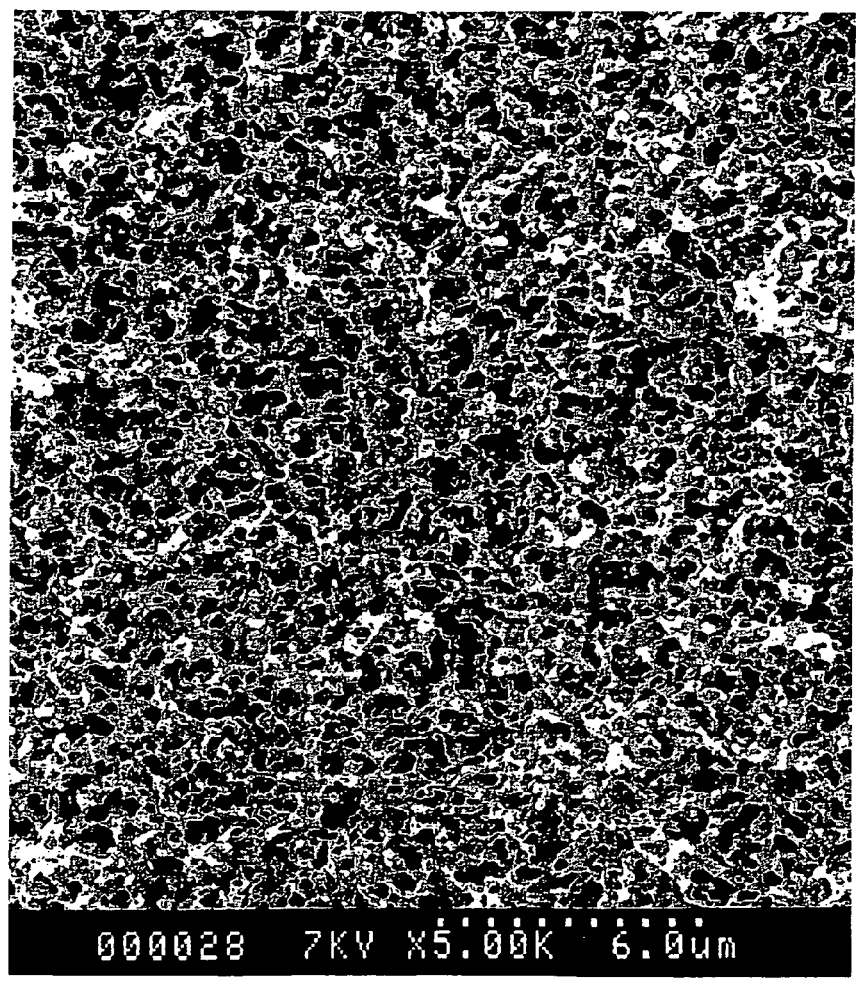
FIG. 24 shows an electron micrograph (magnification: 5000) of the center of a cross section of a porous two-layer hollow fiber membrane obtained in Comparative Example 2.
Figure 25:
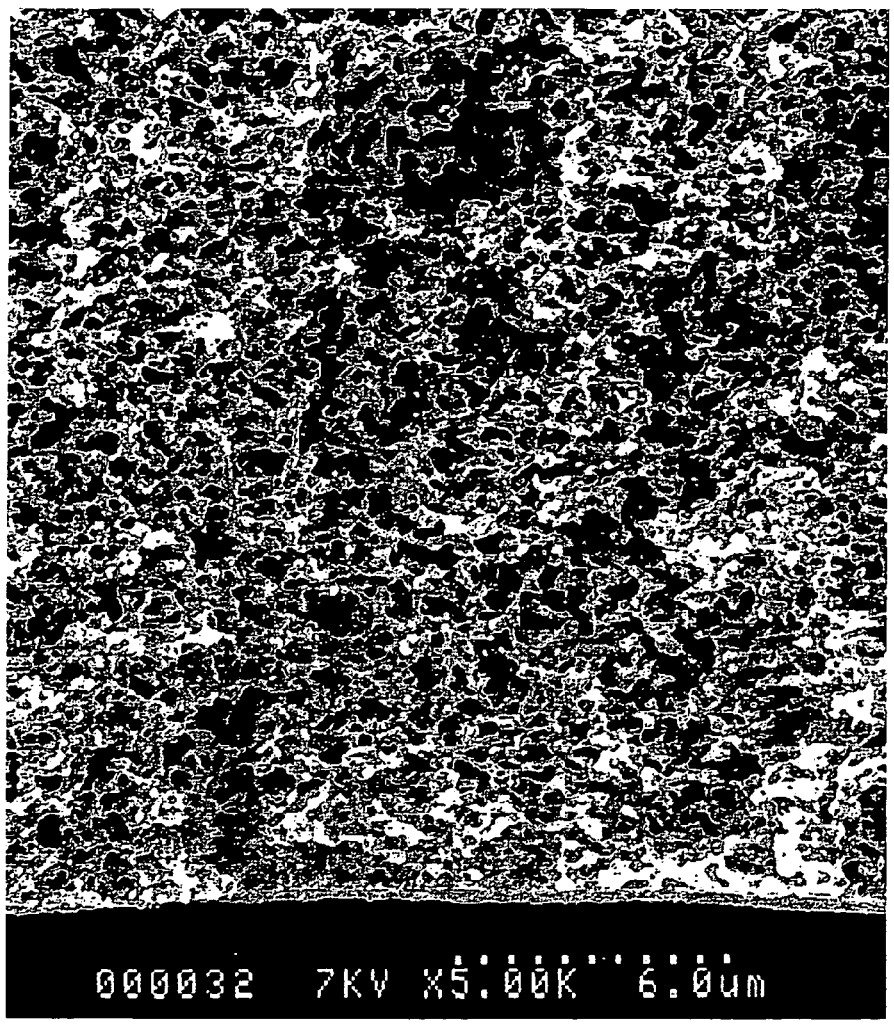
FIG. 25 shows an electron micrograph (magnification: 5000) of a cross section around the inner surface of a porous two-layer hollow fiber membrane obtained in Comparative Example 2.
Figure 26:
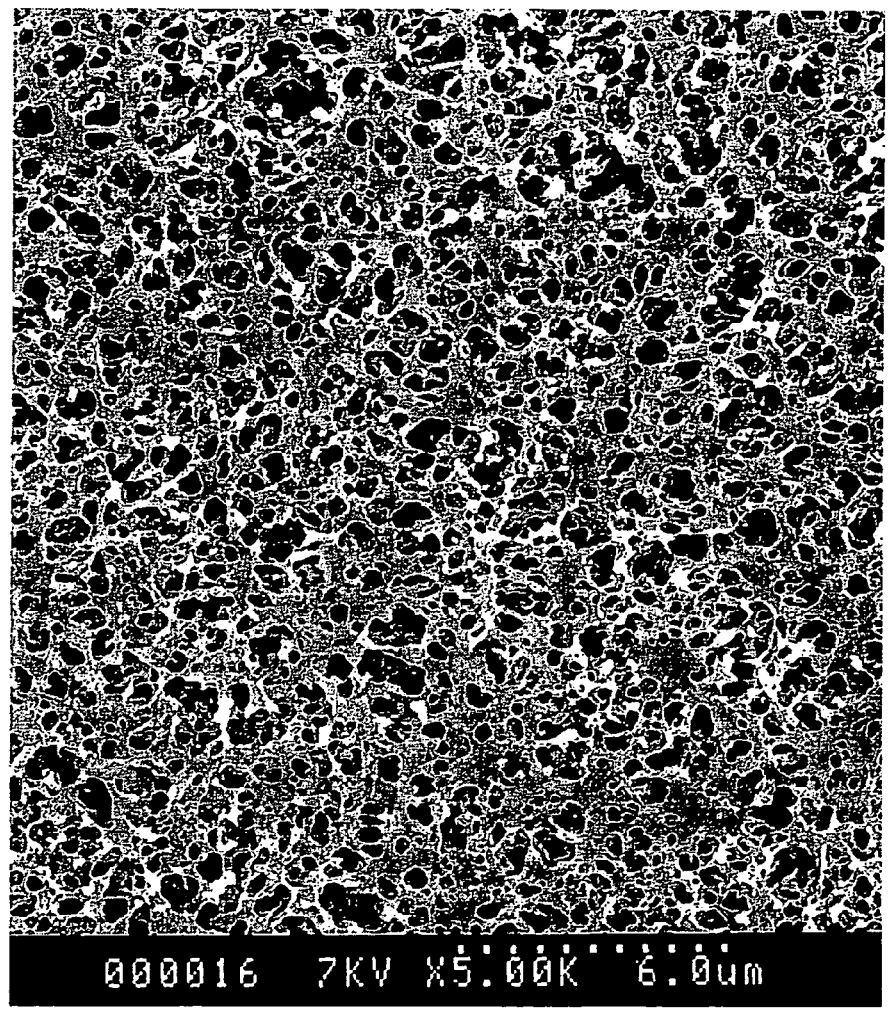
FIG. 26 shows an electron micrograph (magnification: 5000) of the inner surface of a porous two-layer hollow fiber membrane obtained in Comparative Example 2.

FIG. 22 shows an electron microscope image of the outer surface of the porous hollow fiber membrane at a magnification of 5000. FIG. 23 shows an electron microscope image of a portion around the outer surface of the cross section at a magnification of 5000. FIG. 24 shows an electron microscope image of the center of the cross section at a magnification of 5000. FIG. 25 shows an electron microscope image of a portion around the inner surface of the cross section at a magnification of 5000. FIG. 26 shows an electron microscope image of the inner surface at a magnification of 5000.

The porous hollow fiber membrane was wetted by the method (2), and immersed in a 4 mass % sodium hydroxide aqueous solution containing sodium hypochlorite (free chlorine concentration: 0.5 mass %) at room temperature for 10 days. The elongation at break of the porous two-layer hollow fiber membrane was measured before and after immersion. The elongation at break after immersion was 90% of the elongation at break before immersion.

Comparative Example 3

A porous hollow fiber membrane was obtained in the same manner as in Example 1 except that only the inner-layer molten mixture (b) was extruded without extruding the outer-layer molten mixture (a). As a result of cross-sectional observation using an electron microscope, it was confirmed that the resulting porous hollow fiber membrane had an isotropic three-dimensional mesh structure without voids. The property evaluation results of the resulting membrane are shown in Table 2. The porous hollow fiber membrane had a high pure water permeation rate and high mechanical strength, but showed a significantly low blocking rate.

Figure 27:
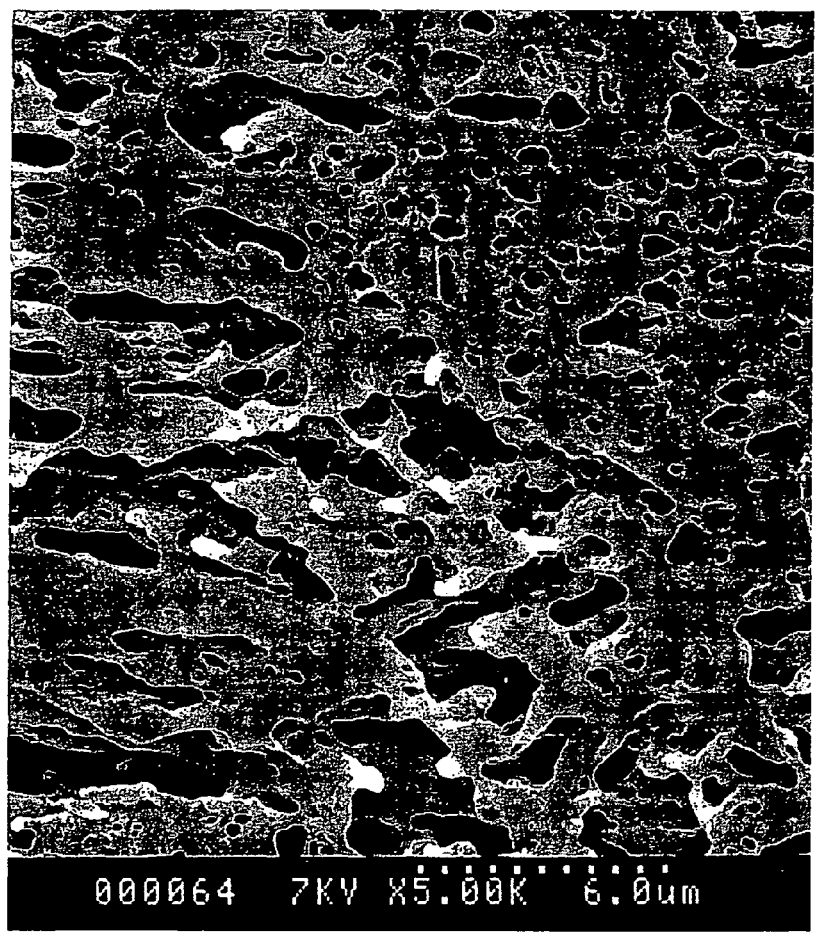
FIG. 27 shows an electron micrograph (magnification: 5000) of the outer surface of a porous hollow fiber membrane obtained in Comparative Example 3.
Figure 28:
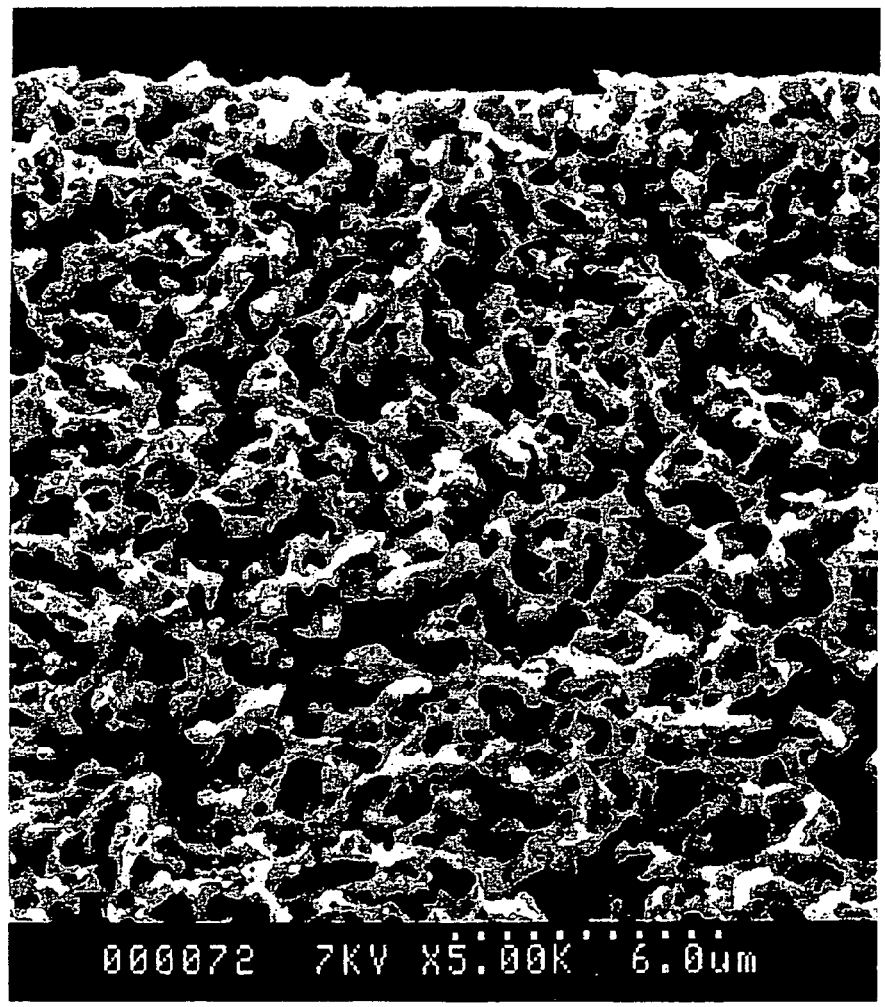
FIG. 28 shows an electron micrograph (magnification: 5000) of a cross section around the outer surface of a porous hollow fiber membrane obtained in Comparative Example 3.
Figure 29:
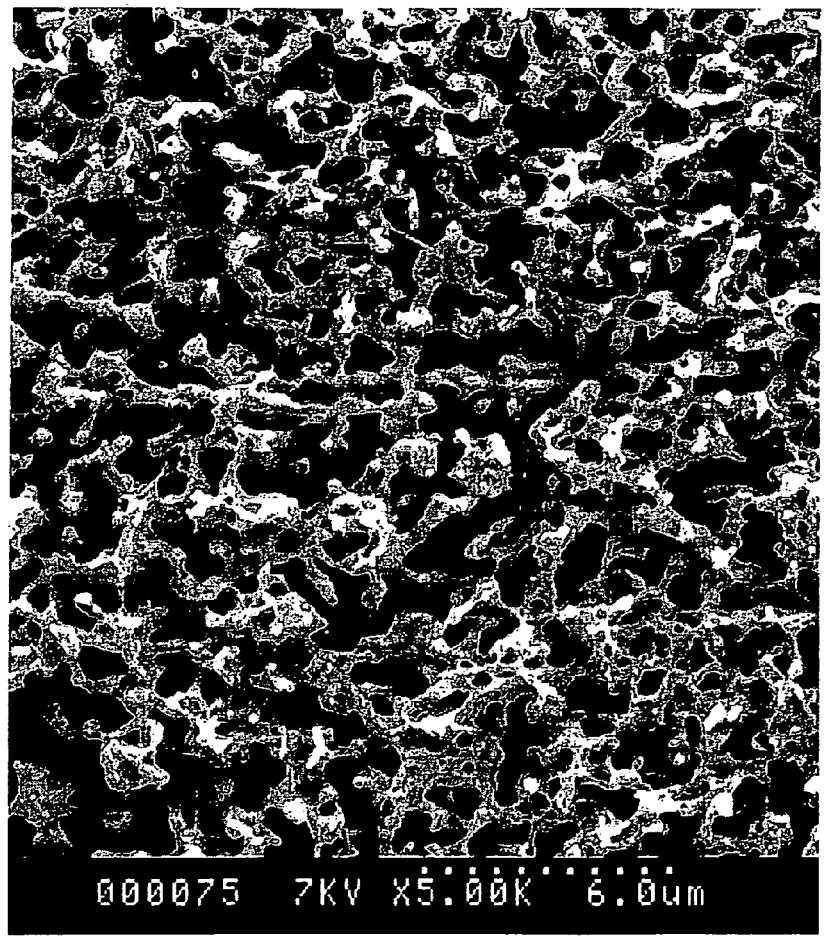
FIG. 29 shows an electron micrograph (magnification: 5000) of the center of a cross section of a porous hollow fiber membrane obtained in Comparative Example 3.
Figure 30:
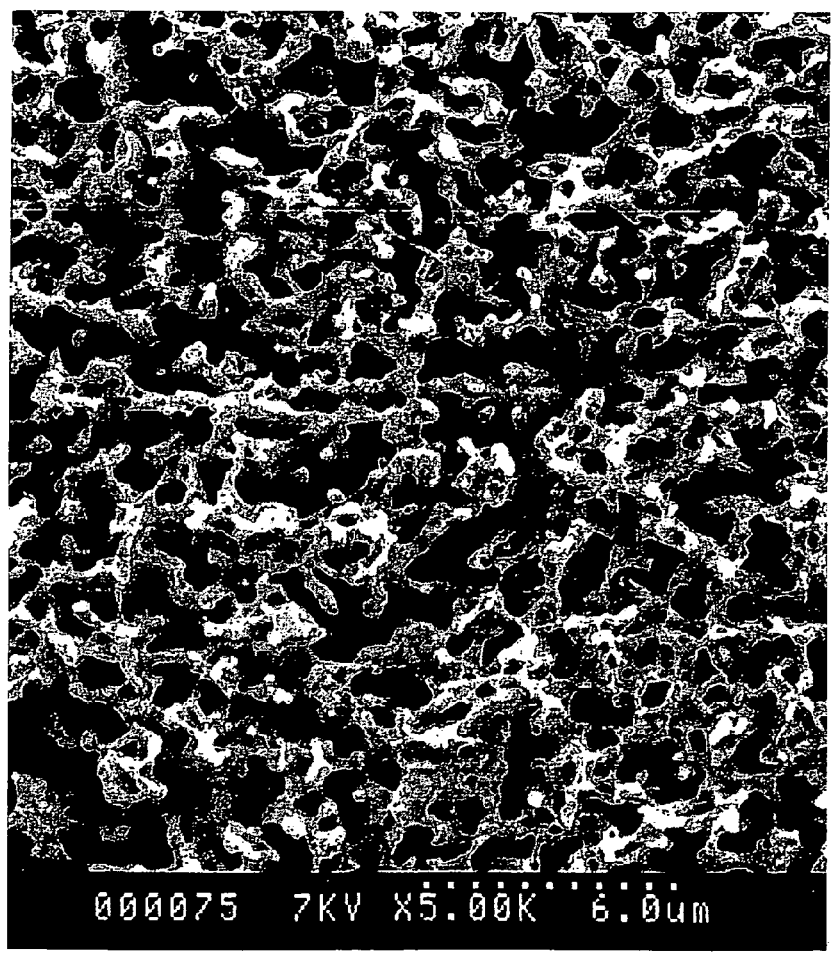
FIG. 30 shows an electron micrograph (magnification: 5000) of a cross section around the inner surface of a porous hollow fiber membrane obtained in Comparative Example 3.
Figure 31:
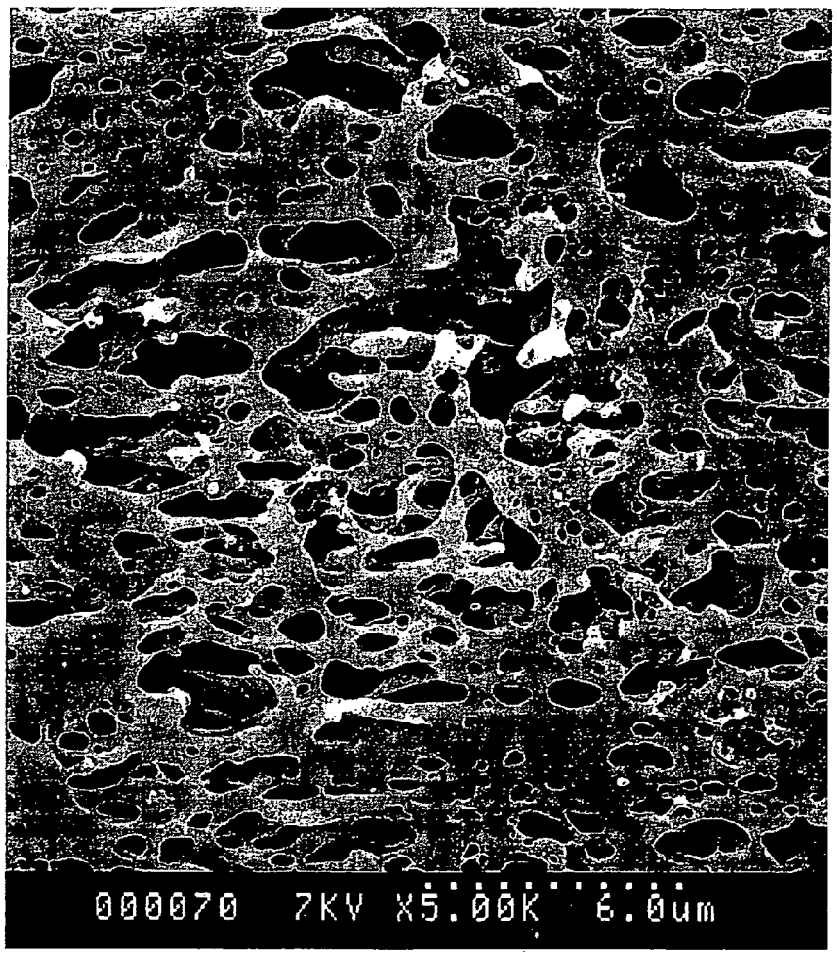
FIG. 31 shows an electron micrograph (magnification: 5000) of the inner surface of a porous hollow fiber membrane obtained in Comparative Example 3.

FIG. 27 shows an electron microscope image of the outer surface of the porous hollow fiber membrane at a magnification of 5000. FIG. 28 shows an electron microscope image of a portion around the outer surface of the cross section at a magnification of 5000. FIG. 29 shows an electron microscope image of the center of the cross section at a magnification of 5000. FIG. 30 shows an electron microscope image of a portion around the inner surface of the cross section at a magnification of 5000. FIG. 31 shows an electron microscope image of the inner surface at a magnification of 5000.

The porous hollow fiber membrane was wetted by the method (2), and immersed in a 4 mass % sodium hydroxide aqueous solution containing sodium hypochlorite (free chlorine concentration: 0.5 mass %) at room temperature for 10 days. The elongation at break of the porous two-layer hollow fiber membrane was measured before and after immersion. The elongation at break after immersion was 90% of the elongation at break before immersion.

Comparative Example 4

A porous hollow fiber membrane was obtained in the same manner as in Example 1 except that the outer-layer molten mixture (a) was not extruded, and only an inner-layer molten mixture (b) having a composition in which polyethylene resin:bis(2-ethylhexyl) phthalate:silica fine powder=20.0:56.0:24.0 (mass ratio) (volume ratio: 23.5:64.2:12.3) was extruded. The property evaluation results of the resulting membrane are shown in Table 2.

Reference Example

A porous hollow fiber membrane was obtained in the same manner as in Example 1 except that the outer-layer molten mixture (a) was not extruded, and only an inner-layer molten mixture (b) having a composition in which vinylidene fluoride homopolymer:γ-butyrolactone=40.0:60.0 (mass ratio) (volume ratio: 29.4:70.6) was extruded referring to Journal of Membrane Science, 52 (1990), pp. 239 to 261 (D. Lloyd) and ACS Symp. Ser., 269 (1985), pp. 229 to 244 (W. C. Hiatt et. al.). The property evaluation results of the resulting membrane are shown in Table 2. The membrane had a low pure water permeation rate, blocking rate, and mechanical strength.

Figure 32:
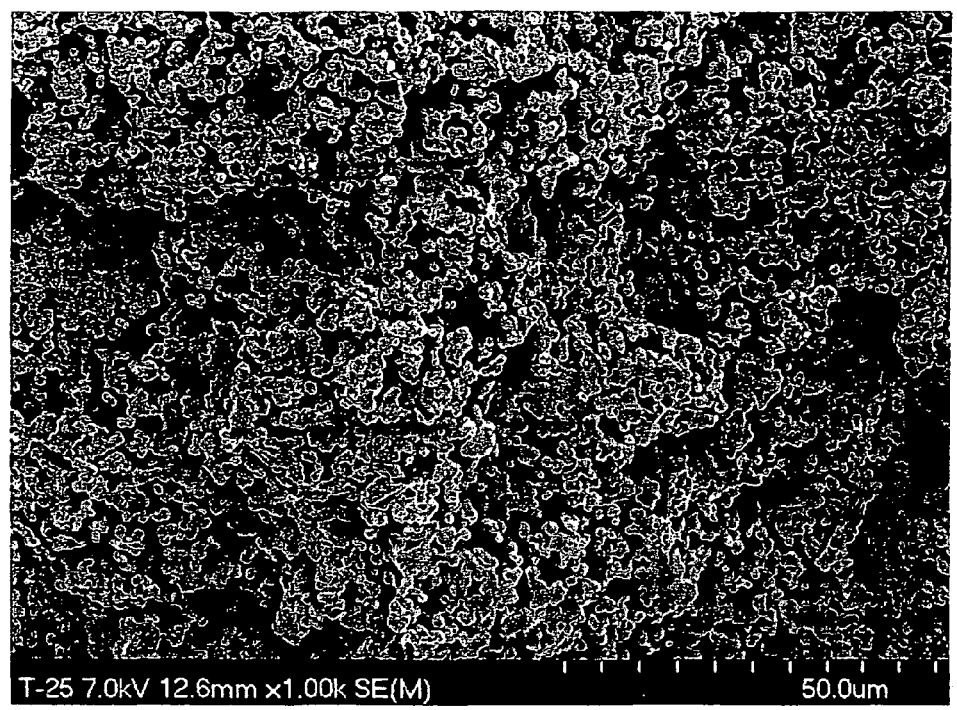
FIG. 32 shows an electron micrograph (magnification: 1000) of the center of a cross section of a porous hollow fiber membrane having a spherulite structure obtained in a reference example.

The hollow fiber membrane did not have a three-dimensional mesh structure, but had a structure in which spherulites were connected. FIG. 32 shows an electron micrograph (magnification: 1000) of the center of the cross section of the porous hollow fiber membrane. The wet porous hollow fiber membrane was immersed in a 4 mass % sodium hydroxide aqueous solution containing sodium hypochlorite (free chlorine concentration: 0.5 mass %) at room temperature for 10 days. The elongation at break of the porous two-layer hollow fiber membrane was measured before and after immersion. The elongation at break after immersion decreased to 10% of the elongation at break before immersion.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 |
| Outer layer | Thermoplastic resin | R-1 | 40.0 | 34.0 | 40.0 | 40.0 | — | 34.0 | 40.0 | 40.0 | 40.0 | 40.0 |
| | | R-2 | — | — | — | — | 20 | — | — | — | — | — |
| | Organic liquid | L-1 | 30.8 | 33.8 | 36.0 | 35.1 | 56.0 | 33.8 | 30.8 | 30.8 | 30.8 | 30.8 |
| | | L-2 | 6.2 | 6.8 | 24.0 | 1.9 | — | 6.8 | 6.2 | 6.2 | 6.2 | 6.2 |
| | Inorganic fine powder | P-1 | 23.0 | 25.4 | — | 23.0 | 24.0 | 25.4 | 23.0 | 23.0 | 23.0 | 23.0 |
| Inner layer | Thermoplastic resin | R-1 | 40.0 | 36.0 | 40.0 | 40.0 | 40.0 | 36.0 | 40.0 | 40.0 | 40.0 | 40.0 |
| | | R-2 | — | — | — | — | — | — | — | — | — | — |
| | Organic liquid | L-1 | 35.1 | 35.3 | 35.1 | 30.8 | 35.1 | 35.3 | 35.1 | 19.1 | 49.9 | 35.1 |
| | | L-2 | 1.9 | 5.0 | 1.9 | 6.2 | 1.9 | 5.00 | 1.9 | 1.0 | 2.6 | 1.9 |
| | | L-3 | — | — | — | — | — | — | — | — | — | — |
| | Inorganic fine powder | P-1 | 23.0 | 23.7 | 23.0 | 23.0 | 23.0 | 23.7 | 23.0 | 39.9 | 7.5 | 23.0 |
| | Resin temperature during merging | | 240 | 240 | 240 | 240 | 240 | 240 | Outer layer: 270 Inner layer: 250 | 240 | 240 | 240 |
| | Discharge linear velocity m/min | | 14.2 | 14.2 | 14.2 | 14.2 | 14.2 | 14.2 | 14.2 | 14.2 | 14.2 | 20.2 |
| | Spinning nozzle discharge parameter R | | 440 | 440 | 440 | 440 | 440 | 440 | 440 | 440 | 440 | 814 |
| | Thickness ratio (outer layer:inner layer) | | 10:90 | 10:90 | 10:90 | 90:10 | 10:90 | 10:90 | 10:90 | 10:90 | 10:90 | 10:90 |
| | Outer diameter of nozzle | | 2.00 | 2.00 | 2.00 | 2.00 | 2.00 | 2.00 | 2.00 | 2.00 | 2.00 | 1.75 |
| | Inner diameter of nozzle | | 0.92 | 0.92 | 0.92 | 0.92 | 0.92 | 0.92 | 0.92 | 0.92 | 0.92 | 0.92 |
| | Travel distance (cm) | | 60 | 60 | 60 | 60 | 60 | 60 | 60 | 60 | 60 | 60 |
| | Winding rate (/min) | | 40 | 40 | 40 | 40 | 40 | 40 | 40 | 40 | 40 | 40 |
| | Spinning stability | | Excellent | Excellent | Excellent | Excellent | Excellent | Excellent | Excellent | Excellent | Good | Excellent |

| | | | Example | | | | Comparative Example | | | | Reference Example |
|---|---|---|---|---|---|---|---|---|---|---|---|
| | | | 11 | 12 | 13 | 14 | 1 | 2 | 3 | 4 | |
| Outer layer | Thermoplastic resin | R-1 | 40.0 | 40.0 | 40.0 | 40.0 | 40.0 | | | | |
| | | R-2 | — | — | — | — | — | — | — | — | — |
| | Organic liquid | L-1 | 30.8 | 30.8 | 30.8 | 30.8 | 36.0 | — | — | — | — |
| | | L-2 | 6.2 | 6.2 | 6.2 | 6.2 | 24.0 | — | — | — | — |
| | Inorganic fine powder | P-1 | 23.0 | 23.0 | 23.0 | 23.0 | — | — | — | — | — |
| Inner layer | Thermoplastic resin | R-1 | 40.0 | 40.0 | 40.0 | 40.0 | 40.0 | 40.0 | 40.0 | | 40.0 |
| | | R-2 | — | — | — | — | — | — | — | 20.0 | — |
| | Organic liquid | L-1 | 35.1 | 35.1 | 35.1 | 35.1 | 42.0 | 30.8 | 35.1 | 56.0 | — |
| | | L-2 | 1.9 | 1.9 | 1.9 | 1.9 | 18.00 | 6.2 | 1.9 | — | — |
| | | L-3 | — | — | — | — | — | — | — | — | 60.0 |
| | Inorganic fine powder | P-1 | 23.0 | 23.0 | 23.0 | 23.0 | — | 23.0 | 23.0 | 24.0 | — |
| | Resin temperature during merging | | 240 | 240 | 240 | 240 | 240 | 240 | 240 | 240 | 240 |
| | Discharge linear velocity m/min | | 10.1 | 0.2 | 25.3 | 14.2 | 14.2 | 14.2 | 14.2 | 14.2 | 14.2 |
| | Spinning nozzle discharge parameter R | | 407 | 8 | 1017 | 440 | 440 | 440 | 440 | 440 | 440 |
| | Thickness ratio (outer layer:inner layer) | | 10:90 | 10:90 | 10:90 | 5:95 | 10:90 | — | — | — | — |
| | Outer diameter of nozzle | | 1.75 | 1.75 | 1.75 | 2.00 | 2.00 | 2.00 | 2.00 | 2.00 | 2.00 |
| | Inner diameter of nozzle | | 0.92 | 0.92 | 0.92 | 0.92 | 0.92 | 0.92 | 0.92 | 0.92 | 0.92 |
| | Travel distance (cm) | | 30 | 0.6 | 75 | 30 | 60 | 60 | 60 | 60 | 60 |
| | Winding rate (/min) | | 20 | 0.4 | 50 | 20 | 40 | 40 | 40 | 40 | 40 |
| | Spinning stability | | Excellent | Good | Excellent | Excellent | Bad | Excellent | Excellent | Excellent | Excellent |

TABLE 2

|  |  | Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Outer diameter | (mm) | 1.25 | 1.25 | 1.25 | 1.25 | 1.25 | 1.22 | 1.25 | 1.25 | 1.25 | 1.25 |
| Inner diameter | (mm) | 0.68 | 0.68 | 0.68 | 0.68 | 0.68 | 0.66 | 0.68 | 0.68 | 0.68 | 0.68 |
| (D/S)/M | Outer layer | 0.52 | 0.52 | — | 0.51 | 0.75 | 0.52 | 0.52 | 0.52 | 0.52 | 0.52 |
|  | Inner layer | 0.51 | 0.57 | 0.51 | 0.52 | 0.51 | 0.51 | 0.51 | 0.16 | 2.22 | 0.51 |
| Aspect ratio | (—) | 1.0 | 1.0 | 1.0 | 1.0 | 1.0 | 1.0 | 1.0 | 1.0 | 1.1 | 1.0 |
| Interface non-uniformity | (—) | None | None | None | None | None | None | None | None | None | None |
| Pure water permeation rate | $L/m^2/hr$ | 7200 | 9000 | 5400 | 7100 | 5900 | 15000 | 6000 | 5500 | 11000 | 7200 |
| Latex blocking rate | (%) | >99 | >99 | >99 | >99 | >99 | 95 | >99 | >99 | 98 | >99 |
| Breaking strength | (MPa) | 12.0 | 9.0 | 11.0 | 12.5 | 12.0 | 10.0 | 13.0 | 14.0 | 8.5 | 13.5 |
| Elongation at break | (%) | 250 | 250 | 100 | 200 | 250 | 120 | 210 | 220 | 150 | 120 |
| Withstand pressure | (MPa) | 0.90 | 0.85 | 0.85 | 0.95 | 0.85 | 0.55 | 0.90 | 0.90 | 0.80 | 0.90 |
| Maximum pore diameter | (μm) | 0.29 | 0.39 | 0.50 | 0.39 | 0.27 | 0.59 | 0.25 | 0.21 | 0.50 | 0.31 |
| Average pore diameter | (μm) | 0.20 | 0.24 | 0.33 | 0.28 | 0.21 | 0.29 | 0.18 | 0.15 | 0.29 | 0.20 |
| Outer surface pore diameter | (μm) | 0.23 | 0.26 | 0.30 | 0.90 | 0.31 | 0.46 | 0.20 | 0.21 | 0.33 | 0.25 |
| Cross-sectional pore diameter | (μm) | 1.18 | 1.12 | 1.25 | 1.30 | 1.35 | 1.42 | 1.21 | 1.26 | 1.55 | 1.23 |
| Inner surface pore diameter | (μm) | 1.15 | 1.01 | 1.18 | 0.36 | 1.21 | 1.59 | 1.13 | 1.18 | 1.63 | 1.14 |
| Outer surface/cross-section pore diameter ratio | — | 0.19 | 0.23 | 0.24 | 0.69 | 0.23 | 0.32 | 0.17 | 0.17 | 0.21 | 0.20 |
| Inner surface/cross-section pore diameter ratio | — | 0.97 | 0.90 | 0.94 | 0.28 | 0.90 | 1.12 | 0.93 | 0.94 | 1.05 | 0.93 |
| Thicknesses ratio of layer (B) | — | 0.13 | 0.12 | 0.03 | 0.13 | 0.14 | 0.13 | 0.13 | 0.13 | 0.13 | 0.13 |
| Degree of isotropy | Layer (A) | >99 | >99 | 98 | 96 | >99 | >99 | >99 | >99 | 87 | >99 |
|  | Layer (B) | >95 | >95 | 65 | 90 | >95 | >95 | 90 | 85 | 75 | >95 |

|  |  | Example |  |  |  | Comparative Example |  |  |  | Reference |
|---|---|---|---|---|---|---|---|---|---|---|
|  |  | 11 | 12 | 13 | 14 | 1 | 2 | 3 | 4 | Example |
| Outer diameter | (mm) | 1.25 | 1.25 | 1.25 | 1.25 | 1.25 | 1.25 | 1.25 | 1.25 | 1.25 |
| Inner diameter | (mm) | 0.68 | 0.68 | 0.68 | 0.68 | 0.68 | 0.68 | 0.68 | 0.68 | 0.68 |
| (D/S)/M | Outer layer | 0.52 | 0.52 | 0.52 | 0.52 | — | — | — | — | — |
|  | Inner layer | 0.51 | 0.51 | 0.51 | 0.51 | — | 0.52 | 0.51 | 0.75 | — |
| Aspect ratio | (—) | 1.0 | 1.0 | 1.0 | 1.0 | 1.5 | 1.0 | 1.0 | 1.0 | 1.2 |
| Interface non-uniformity | (—) | None | None | None | None | Occurred | — | — | — | — |
| Pure water permeation rate | $L/m^2/hr$ | 7200 | 7200 | 7300 | 8300 | 4000 | 2000 | 10000 | 1200 | 2200 |
| Latex blocking rate | (%) | >99 | >99 | >99 | >99 | 50 | >99 | <5 | >99 | 15 |
| Breaking strength | (MPa) | 13.5 | 13.0 | 13.5 | 13.5 | 9.0 | 8.5 | 14.0 | 6.5 | 17.0 |
| Elongation at break | (%) | 250 | 300 | 90 | 220 | 70 | 220 | 250 | 450 | 70 |
| Withstand pressure | (MPa) | 0.90 | 0.90 | 0.90 | 0.90 | 0.40 | 1.50 | 0.90 | 0.70 | 0.60 |
| Maximum pore diameter | (μm) | 0.29 | 0.30 | 0.29 | 0.39 | 0.67 | 0.27 | 0.71 | 0.24 | — |
| Average pore diameter | (μm) | 0.21 | 0.20 | 0.20 | 0.22 | 0.45 | 0.20 | 0.40 | 0.19 | — |
| Outer surface pore diameter | (μm) | 0.25 | 0.23 | 0.26 | 0.25 | 0.41 | 0.31 | 0.90 | 0.28 | — |
| Cross-sectional pore diameter | (μm) | 1.18 | 1.25 | 1.22 | 1.28 | 1.83 | 0.30 | 1.30 | 0.29 | — |
| Inner surface pore diameter | (μm) | 1.12 | 1.19 | 1.16 | 1.14 | 3.27 | 0.38 | 1.10 | 0.33 | — |
| Outer surface/cross-section pore diameter ratio | — | 0.21 | 0.18 | 0.21 | 0.20 | 0.22 | 1.03 | 0.69 | 0.97 | — |
| Inner surface/cross-section pore diameter ratio | — | 0.95 | 0.95 | 0.95 | 0.89 | 1.79 | 1.27 | 0.85 | 1.14 | — |
| Thicknesses ratio of layer (B) | — | 0.12 | 0.13 | 0.13 | 0.06 | 0.30 | — | — | — | — |
| Degree of isotropy | Layer (A) | >99 | >99 | >99 | >99 | 39 | — | — | — | — |
|  | Layer (B) | >95 | >95 | >95 | 95 | 45 | — | — | — | — |

INDUSTRIAL APPLICABILITY

According to the present invention, a porous hollow fiber membrane which has minute pores and high water permeability suitable for filtration and exhibits excellent strength can be provided. According to the present invention, the porous multilayer hollow fiber membrane can be stably produced.

The invention claimed is:

1. A process for producing a porous multilayer hollow fiber membrane by a hollow fiber molding nozzle with a circular discharge port, the process comprising discharging a molten mixture including a thermoplastic resin and an organic liquid from a circular discharge port of a hollow fiber molding nozzle to obtain a multilayer hollow fiber, and removing the organic liquid from the multilayer hollow fiber by extraction to obtain a porous multilayer hollow fiber membrane, the hollow fiber molding nozzle having two or more circular discharge ports which are disposed concentrically, molten mixtures which differ in composition being discharged from the adjacent discharge ports, the molten mixture discharged from at least one of the circular discharge ports further including an inorganic fine powder, and the inorganic fine powder being also removed from the resulting multilayer hollow fiber by extraction.

2. The process for producing a porous multilayer hollow fiber membrane according to claim 1, wherein the thermoplastic resin, the organic liquid, and further the inorganic fine powder are mixed in at least a molten mixture which is discharged in a largest amount among the molten mixtures discharged from the circular discharge ports.

3. The process for producing a porous multilayer hollow fiber membrane according to claim 1, wherein the inorganic fine powder is a silica fine powder.

4. The process for producing a porous multilayer hollow fiber membrane according to claim 1, wherein the molten mixture discharged from a circular discharge port includes the inorganic fine powder in an amount of 5 mass % or more and 40 mass % or less.

5. The process for producing a porous multilayer hollow fiber membrane according to claim 1, wherein a mass ratio D of the organic liquid and a mass ratio S of the inorganic fine powder with respect to the molten mixture and a maximum mass M of the organic liquid absorbed by the inorganic fine powder per unit mass satisfy $0.2 \leq (D/S)/M \leq 2$.

6. The process for producing a porous multilayer hollow fiber membrane according to claim 1, wherein the molten mixtures discharged from the adjacent circular discharge ports include at least one common organic liquid.

7. The process for producing a porous multilayer hollow fiber membrane according to claim 1, wherein organic liquids contained in the molten mixtures discharged from the adjacent circular discharge ports are the same in kind but differ in ratio.

8. The process for producing a porous multilayer hollow fiber membrane according to claim 1, wherein the multilayer hollow fiber is stretched in a longitudinal direction of the hollow fiber at a stretch ratio of 1.1 or more and 3 or less before or after removing the organic liquid and/or the inorganic fine powder by extraction.

9. The process for producing a porous multilayer hollow fiber membrane according to removing claim 1, wherein the thermoplastic resin is selected from a polyolefin and polyvinylidene fluoride.

10. The process for producing a porous multilayer hollow fiber membrane according to claim 1, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

11. A porous multilayer hollow fiber membrane comprising at least two layers, the porous multilayer hollow fiber membrane being formed of a thermoplastic resin, at least one layer (A) among the two layers being a support layer having an isotropic three-dimensional mesh structure and a surface pore diameter 0.6 to 1.4 times a cross-sectional center pore diameter, and the other layer (B) among the two layers having a surface pore diameter less than half of the cross-sectional center pore diameter and having an isotropic three-dimensional mesh structure.

12. The porous multilayer hollow fiber membrane according to claim 11, wherein the layer (B) has a surface pore diameter of 0.01 μm or more and less than 5 μm.

13. The porous multilayer hollow fiber membrane according to claim 11, wherein the cross-sectional center pore diameter is 0.1 μm or more and 10 μm or less.

14. The porous multilayer hollow fiber membrane according to claim 11, wherein the layer (B) has a surface porosity of 20% or more and 80% or less.

15. The porous multilayer hollow fiber membrane according to claim 11, wherein the layer (B) has a thickness of 1/100 or more and 40/100 or less of the thickness of the porous multilayer hollow fiber membrane.

16. The porous multilayer hollow fiber membrane according to claim 11, wherein the layer (A) and the layer (B) both have a degree of isotropy of 80% or more.

17. The porous multilayer hollow fiber membrane according to claim 11, wherein the number of parameters Q which satisfy $-0.2 \leq Q \leq 0.2$ is 80% or more of the total number of parameters Q measured values, the parameter Q being a value which indicates a pore diameter change rate at each position from an outer surface to an inner surface of the porous multilayer hollow fiber membrane in its thickness direction.

18. The porous multilayer hollow fiber membrane according to claim 11, wherein the thermoplastic resin is selected from a polyolefin and polyvinylidene fluoride.

19. The porous multilayer hollow fiber membrane according to claim 11, wherein the porous multilayer hollow fiber membrane has an inner diameter of 0.4 mm or more and 5 mm or less and a thickness of 02 mm or more and 1 mm or less.

20. A porous multilayer hollow fiber membrane produced by the process according to claim 1.

21. A porous multilayer hollow fiber membrane comprising at least two layers, the porous multilayer hollow fiber membrane being formed of a thermoplastic resin, at least one layer (A) among the two layers being a support layer having an isotropic three-dimensional mesh structure and a surface pore diameter 0.6 to 1.4 times a cross-sectional center pore diameter, and the other layer (B) among the two layers having a surface pore diameter less than half of the cross-sectional center pore diameter and having an isotropic three-dimensional mesh structure, the porous multilayer hollow fiber membrane being produced by the process according to claim 10.

22. The process for producing a porous multilayer hollow fiber membrane according to claim 2, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

23. The process for producing a porous multilayer hollow fiber membrane according to claim 3, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

24. The process for producing a porous multilayer hollow fiber membrane according to claim 4, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

25. The process for producing a porous multilayer hollow fiber membrane according to claim 5, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

26. The process for producing a porous multilayer hollow fiber membrane according to claim 6, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

27. The process for producing a porous multilayer hollow fiber membrane according to claim 7, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

28. The process for producing a porous multilayer hollow fiber membrane according to claim 8, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

29. The process for producing a porous multilayer hollow fiber membrane according to claim 9, wherein the molten mixture is discharged so that at least one spinning nozzle discharge parameter R (1/sec) is 10 or more and 1000 or less, the spinning nozzle discharge parameter R being a value obtained by dividing a linear velocity V (m/sec) when discharging the molten mixture by a slit width d (m) of the discharge port.

* * * * *